(12) United States Patent
Brodhun et al.

(10) Patent No.: US 7,844,618 B2
(45) Date of Patent: *Nov. 30, 2010

(54) TECHNIQUES FOR MANAGING INTERDEPENDENT DATA OBJECTS

(75) Inventors: Mark A. Brodhun, Byron, MN (US); Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 484 days.

This patent is subject to a terminal disclaimer.

(21) Appl. No.: 12/019,458

(22) Filed: Jan. 24, 2008

(65) Prior Publication Data

US 2008/0140636 A1 Jun. 12, 2008

Related U.S. Application Data

(63) Continuation of application No. 11/005,436, filed on Dec. 6, 2004, now Pat. No. 7,359,908.

(51) Int. Cl.
*G06F 7/00* (2006.01)
(52) U.S. Cl. .......................... 707/760; 707/803; 707/955
(58) Field of Classification Search .................. 707/760, 707/803, 955
See application file for complete search history.

(56) References Cited

U.S. PATENT DOCUMENTS 5,311,424 A 5/1994 Mukherjee et al.
5,734,887 A 3/1998 Kingberg et al.
6,725,227 B1 4/2004 Li
6,920,467 B1 7/2005 Yoshimoto
6,996,558 B2 2/2006 Dettinger et al.
2003/0167274 A1 9/2003 Dettinger et al.
2003/0172056 A1 9/2003 Dettinger et al.

OTHER PUBLICATIONS

Office Action dated Feb. 22, 2007 for parent U.S. Appl. No. 11/005,436.
Notice of Allowance dated Sep. 7, 2007 for parent U.S. Appl. No. 11/005,436.

*Primary Examiner*—Cheyne D Ly
(74) *Attorney, Agent, or Firm*—Patterson & Sheridan, LLP

(57) ABSTRACT

System and article of manufacture for managing modifications to at least one of a plurality of interdependent data objects. A computer-readable storage medium contains a program which, when executed by a processor, performs operations for managing modifications to at least one of a plurality of interdependent data objects. The operations include receiving a request for modification of a given data object having at least one dependent data object and accessing a directory of dependencies containing records for each of the interdependent data objects including the at least one dependent data object. Each record describes an interdependency between at least two of the interdependent data objects. A record for the at least one dependent data object describes an interdependency between the given data object and the at least one dependent data object. Using the accessed directory of dependencies, the interdependency between the given data object and the at least one dependent data object is identified. On the basis that the identified interdependency presents a possible undesired consequence if the requested modification is performed, a predefined action is performed.

21 Claims, 11 Drawing Sheets

TECHNIQUES FOR MANAGING INTERDEPENDENT DATA OBJECTS

CROSS-RELATED APPLICATION

This application is a continuation of U.S. patent application Ser. No. 11/005,436, filed Dec. 6, 2004 now U.S. Pat. No. 7,359,908, which is herein incorporated by reference in its entirety.

BACKGROUND OF THE INVENTION

1. Field of the Invention

The present invention generally relates to managing interdependent data objects and, more particularly, to managing modifications to at least one of a plurality of interdependent data objects.

2. Description of the Related Art

Databases are computerized information storage and retrieval systems. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a database management system (DBMS) can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Unfortunately, generating queries using SQL (and other query languages) may require a detailed understanding of the possibly complex physical layout of the underlying database and interpretation of cryptic field names. For some applications, to facilitate the query building process, an abstraction model may be utilized that, in effect, hides some of the complexities of the physical layout of the underlying database from users. The abstraction model may include logical fields with recognizable names that map to corresponding physical fields of the underlying database. "Abstract" queries may be generated containing conditions based on the logical fields. Upon issuance, the logical fields of an abstract query may be mapped to corresponding physical fields to create a physical or "concrete" query. For some applications, abstract queries may be saved, allowing subsequent users to reuse the saved abstract queries without having to generate their own. The concepts of data abstraction and abstract queries are described in detail in the commonly owned, co-pending application Ser. No. 10/083,075, entitled "APPLICATION PORTABILITY AND EXTENSIBILITY THROUGH DATABASE SCHEMA AND QUERY ABSTRACTION", filed Feb. 26, 2002, issued as U.S. Pat. No. 6,996,558B2, on Feb. 7, 2007, herein incorporated by reference in its entirety.

Abstract queries often contain a conditional element (e.g., a WHERE clause in a corresponding SQL statement) in which a logical field is used within an expression with a comparison operator. As described in the related application Ser. No. 10/083,075, logical fields are typically mapped to a particular physical field in a physical database. For instance, if the physical database was implemented as a relational database, a particular logical field would be mapped to a particular column within a relational table.

Using a data abstraction model according to the framework of the '075 application, abstract queries can be constructed based on the framework without regard for the makeup of the underlying physical data. For instance, assume a user in a hospital who wants to determine last and first names of patients having had a Hemoglobin test (HgBA1c) with a corresponding result value greater than 10%. To this end, the user may specify the following abstract query:

FIND LAST NAME, FIRST NAME
WHERE HGBA1C-RESULT >10 where "LAST NAME", "FIRST NAME" and "HGBA1C-RESULT" are logical field names of respective logical fields defined by the data abstraction model. While the logical fields map to physical fields, the user constructs abstract queries on the basis of the data abstraction model, without requiring any knowledge of the physical data.

In a framework such as the one of the '075 application, data objects used in a given environment can be stored persistently. For instance, in the above example, the data abstraction model defining at least the logical fields "LAST NAME", "FIRST NAME" and "HGBA1C-RESULT" and the abstract query which uses these logical fields can be stored persistently. One issue that arises where objects are stored persistently is the effect of changes to the framework environment in which users operate. For instance, the given user may modify or delete a logical field of the data abstraction model or redefine a query condition of the abstract query. However, such changes may affect one or more of the persistently stored objects. For instance, assume that in the given example a user deletes the logical field "HGBA1C-RESULT" from the data abstraction model. As the exemplary abstract query (shown above) uses this logical field as a condition field, the abstract query can no longer be loaded and executed and, thus, becomes invalid.

Therefore, there is a need for an efficient technique for tracking and coordinating modifications to interdependent objects.

SUMMARY OF THE INVENTION

The present invention is generally directed to a method, system and article of manufacture for managing interdependent data objects and, more particularly, for managing modifications to at least one of a plurality of interdependent data objects.

One embodiment provides a computer-implemented method of managing modifications to at least one of a plurality of interdependent data objects. The method comprises receiving a request for modification of a given data object having at least one dependent data object. The method further comprises accessing a directory of dependencies containing at least one record for each of the plurality of interdependent data objects including the at least one dependent data object. Each record describes an interdependency between at least two of the interdependent data objects. A record for the at least one dependent data object describes an interdependency between the given data object and the at least one dependent data object. Using the accessed directory of dependencies, the interdependency between the given data object and the at least one dependent data object is identified. On the basis that the identified interdependency presents a possible undesired consequence if the requested modification is performed, a predefined action is performed.

Another embodiment provides a computer-implemented method of managing modifications to a data abstraction model abstractly describing data in a database and defining a plurality of logical fields. The method comprises receiving a request for modification of a given logical field from the data abstraction model. The given logical field defines an abstract representation of a specific set of physical data in the database and has at least one dependent data object. The method further comprises accessing a directory of dependencies containing at least one record for each of the plurality of logical fields and a plurality of interdependent objects including the at least one dependent data object. Each record describes an interdependency between at least two of the interdependent data objects. A record for the at least one dependent data object describes an interdependency between the given logical field and the at least one dependent data object. Using the accessed directory of dependencies, the interdependency between the given logical field and the at least one dependent data object is identified. On the basis that the identified interdependency presents a possible undesired consequence if the requested modification is performed, a predefined action is performed.

Still another embodiment provides a computer-readable medium containing a program which, when executed by a processor, performs operations for managing modifications to at least one of a plurality of interdependent data objects. The operations comprise receiving a request for modification of a given data object having at least one dependent data object. The operations further comprise accessing a directory of dependencies containing at least one record for each of the plurality of interdependent data objects including the at least one dependent data object. Each record describes an interdependency between at least two of the interdependent data objects. A record for the at least one dependent data object describes an interdependency between the given data object and the at least one dependent data object. Using the accessed directory of dependencies, the interdependency between the given data object and the at least one dependent data object is identified. On the basis that the identified interdependency presents a possible undesired consequence if the requested modification is performed, a predefined action is performed.

Still another embodiment provides a computer-readable medium containing a program which, when executed by a processor, performs operations for managing modifications to a data abstraction model abstractly describing data in a database and defining a plurality of logical fields. The operations comprise receiving a request for modification of a given logical field from the data abstraction model. The given logical field defines an abstract representation of a specific set of physical data in the database and has at least one dependent data object. The operations further comprise accessing a directory of dependencies containing at least one record for each of the plurality of logical fields and a plurality of interdependent objects including the at least one dependent data object. Each record describes an interdependency between at least two of the interdependent data objects. A record for the at least one dependent data object describes an interdependency between the given logical field and the at least one dependent data object. Using the accessed directory of dependencies, the interdependency between the given logical field and the at least one dependent data object is identified. On the basis that the identified interdependency presents a possible undesired consequence if the requested modification is performed, a predefined action is performed.

Still another embodiment provides a system comprising a plurality of interdependent data objects, a directory of dependencies and an object modifications management component. The plurality of interdependent data objects includes a given data object having at least one dependent data object. The directory of dependencies contains at least one record for each of the plurality of interdependent data objects including the at least one dependent data object. Each record describes an interdependency between at least two of the interdependent data objects. A record for the at least one dependent data object describes an interdependency between the given data object and the at least one dependent data object. The object modifications management component is configured to receive a request for modification of the given data object, and to identify the interdependency between the given data object and the at least one dependent data object using the directory of dependencies. The object modifications management component is further configured to perform a predefined action on the basis that the identified interdependency presents a possible undesired consequence if the requested modification is performed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
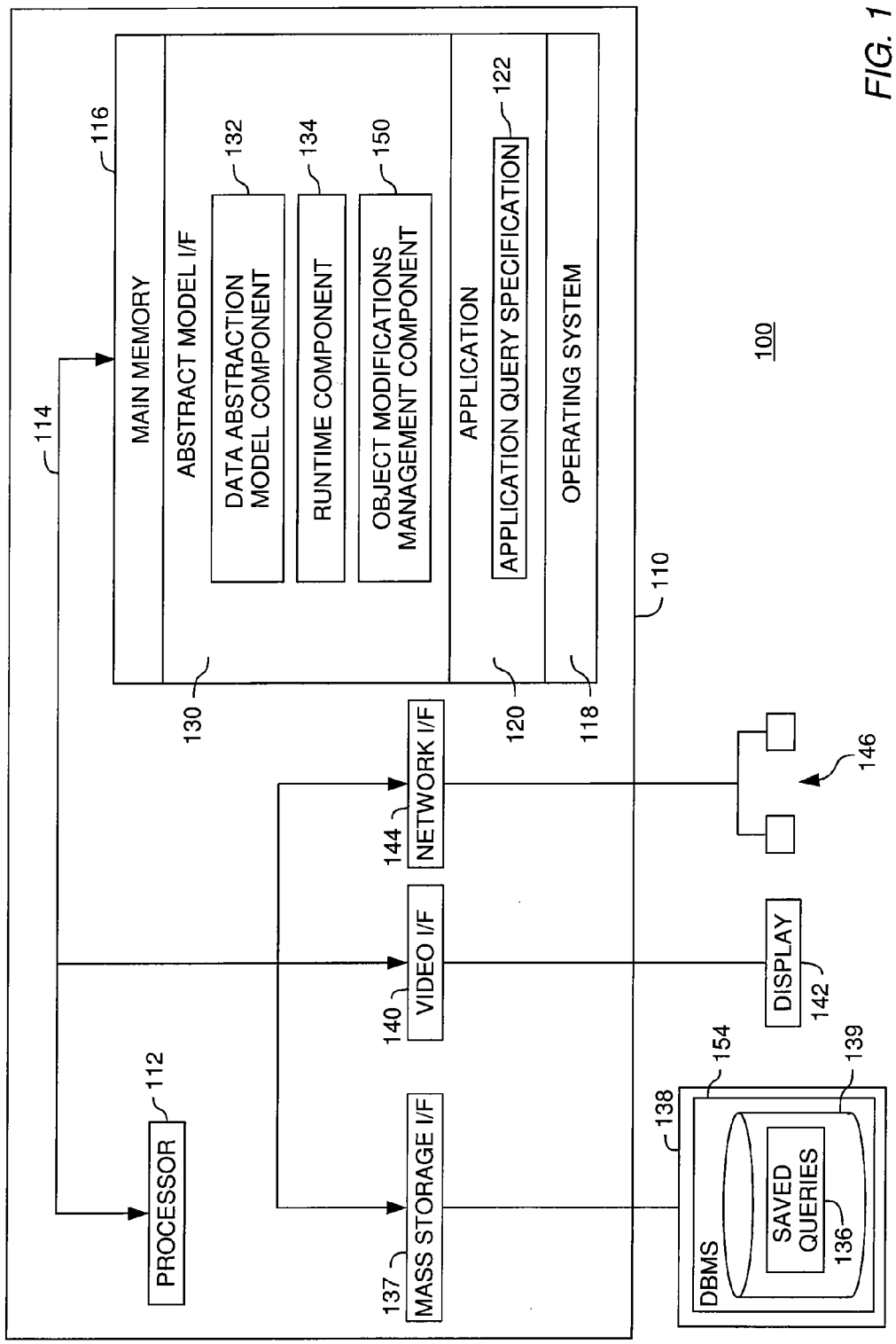
FIG. 1 is a computer system illustratively utilized in accordance with the invention.

The present invention generally is directed to a system, method and article of manufacture for managing interdependent data objects and, more particularly, for managing modifications to at least one of a plurality of interdependent data objects. The plurality of interdependent data objects includes a given data object having an interdependency with one or more dependent data objects which are also included with the plurality of interdependent data objects. By way of example, the given data object is a data field from a database table, such as a table column, and a corresponding dependent data object is a query which uses the data field as a result and/or a condition field.

According to one aspect, a request for modification of the given data object is received. For instance, a request to: (i) delete the given data object, (ii) rename the given data object, or (iii) change one or more attributes of the given data object is received. According to another aspect, a modification of the given data object occurs in response to a change of roles of a given user or with respect to a change from a first to a second user, each having different associated authorizations. For instance, the given user is allowed to access the given data object in a first role (e.g., as an administrator with full access privileges), while the given data object is hidden to the given user in a second role (e.g., a researcher having limited access privileges). Similarly, a first user may have authorization to access the given data object, while the authorization of the second user prevents access to the given data object for the second user. According to one aspect, hiding the given data object or disabling access to the given data object can be treated as a modification for deleting the given data object.

In one embodiment, if the given data object is modified, the interdependency between the given data object and the dependent data object(s) presents a possible undesired consequence. For instance, the modification of the given data object may affect the dependent data object(s) such that the dependent data object(s) becomes invalid in response to performance of the modification. In one aspect, the modification and the possible undesired consequence can be managed by performing a predefined action(s). By way of example, if a request for deletion of the given data object is received, the given data object can be deleted and access to the dependent data object(s) can be disabled in order to avoid execution of an invalid data object. To this end, the dependent data object(s) is identified from the plurality of interdependent data objects using a directory of dependencies. The directory of dependencies contains at least one record for each of the plurality of interdependent data objects. Each record describes an interdependency between at least two of the interdependent data objects. Furthermore, a given record for the dependent data object(s) describes the interdependency between the given data object and the dependent data object(s). Thus, by identifying the given record from the table of dependencies, the dependent data object(s) can be identified. After identification of the dependent data object(s), the predefined action(s) can be performed.

In one embodiment, the given data object is a given logical field of a data abstraction model abstractly describing data in a database. The given logical field defines an abstract representation of a specific set of physical data in the database. More specifically, the data abstraction model defines a plurality of logical fields, each being mapped to one or more physical entities of the data in the database. The data abstraction model is adapted for facilitating transformation of the logical fields of abstract queries into a form consistent with a physical representation of the data in the database. Accordingly, a corresponding dependent data object can be an abstract query containing the given logical field as result and/or condition field.

It should be noted that embodiments of the present invention can be explained below, by way of example, with reference to abstract queries which are created on the basis of a corresponding data abstraction model. However, other embodiments can be implemented using other types of queries and database representations, such as SQL or XML queries issued against data in databases having an underlying relational or XML data representation. Accordingly, the present invention is not limited to a particular query environment, including abstract queries and data abstraction models, and various different query environments and implementations are broadly contemplated. More generally, the present invention is applicable to any interdependent data objects, whereby the term "interdependent data objects" includes any data objects having at least one-way dependency. For instance, if a data object "A" has a dependency on a data object "B", the data objects "A" and "B" are termed to be interdependent regardless of whether the data object "B" also has a dependency on data object "A". Accordingly, management of any interdependent data objects using suitable techniques according to embodiments of the invention is broadly contemplated.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Exemplary Data Processing Environment

Referring now to FIG. 1, a computing environment 100 is shown. In general, the distributed environment 100 includes computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer computer available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more applications 120 and an abstract model interface 130. The applications 120 and the abstract model interface 130 are software products comprising a plurality of instructions that are resident at various times in various memory and storage devices in the computer system 110. When read and executed by one or more processors 112 in the computer system 110, the applications 120 and the abstract model interface 130 cause the computer system 110 to perform the steps necessary to execute steps or elements embodying the various aspects of the invention.

The applications 120 (and more generally, any requesting entity, including the operating system 118) are configured to issue queries against a database 139. Illustratively, the database 139 is shown as part of a database management system (DBMS) 154 in storage 138. The database 139 is representative of any collection of data regardless of the particular physical representation of the data. A physical representation of data defines an organizational schema of the data. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") can be composed using logical fields defined by the abstract model interface 130. A logical field defines an abstract view of data whether as an individual data item or a data structure in the form of, for example, a database table. In particular, the logical fields used in the abstract queries are defined by a data abstraction model component 132 of the abstract model interface 130.

In one embodiment, the data abstraction model component 132 and/or the logical fields thereof can be modified. Such modifications may present possible undesired consequences with respect to dependent data objects, i.e., data objects which use or which are created on the basis of the data abstraction model component 132. For instance, a given abstract query may use a given logical field as a result and/or condition field. If the given logical field is modified, the given abstract query can become invalid in response to the modification(s) of the given logical field. The modification(s) to the given logical field and consequences to dependent data object(s) such as the given abstract query are managed by an object modifications management component 150. The object modifications management component 150 is illustratively shown as part of the abstract model interface 130. However, various other implementations are broadly contemplated. For instance, the object modifications management component 150 can also be implemented as part of the DBMS 154. Operation of the object modifications management component 150 is further described below with reference to FIGS. 6-8.

In one embodiment, the abstract queries are stored in the database 139 as persistent data objects 136 (referred to as "saved queries") to allow re-use thereof. Thus, the abstract queries can be retrieved at any time and executed against any suitable data source, e.g., against the database 139.

Abstract queries are executed against the database 139 by a runtime component 134 which first transforms the abstract queries into concrete queries having a form consistent with the physical representation of the data contained in the database 139. Operation of the runtime component 134 is further described below with reference to FIGS. 2-5.

Logical/Runtime View of Environment

Figure 2A:
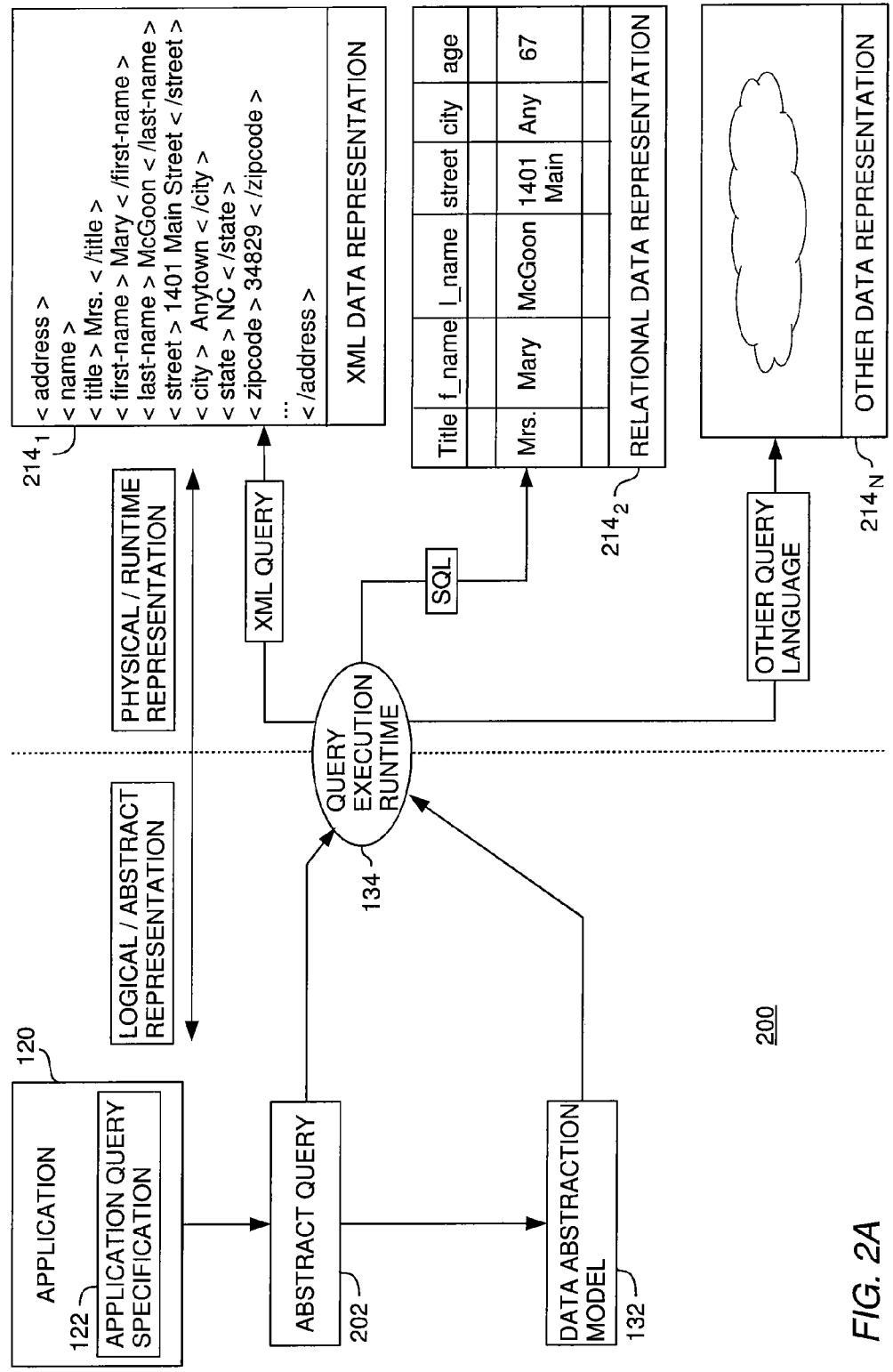
FIGS. 2A-B are relational views of software components in one embodiment.
Figure 2B:
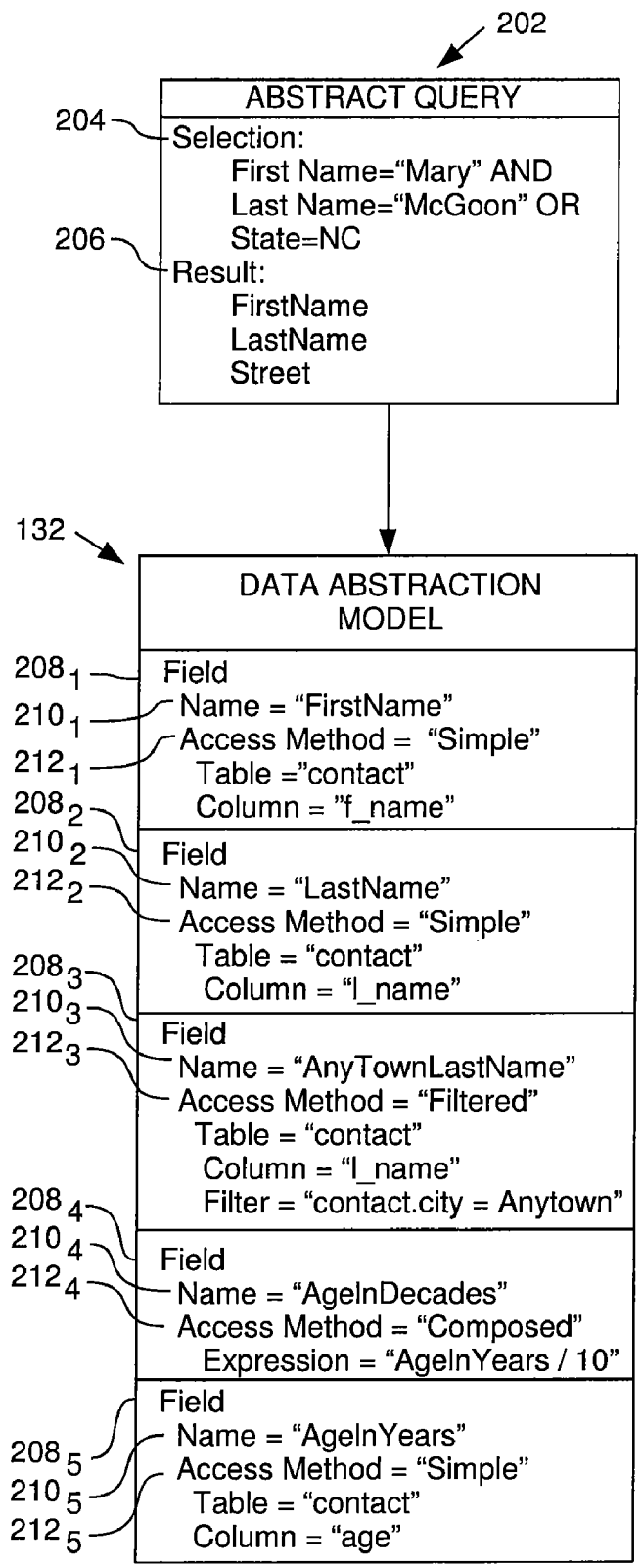

FIGS. 2A-B show an illustrative relational view 200 of components of the invention. A requesting entity (e.g., one of the applications 120 of FIG. 1) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 122 may include both criteria used for data selection (selection criteria 204) and an explicit specification of the fields to be returned (return data specification 206) based on the selection criteria 204.

As was noted above, the logical fields specified by the application query specification 122 and used to compose the abstract query 202 are defined by the data abstraction model component 132. In general, the data abstraction model component 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in a corresponding database (e.g., database 139 of FIG. 1), thereby allowing queries to be formed that are loosely coupled to the underlying data representation.

In one embodiment, the data abstraction model component 132 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification contains a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in the database (e.g., database 139 of FIG. 1). By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model component 132 contains field specifications (with associated access methods) for two or more physical data representations 214. In an alternative embodiment, a different single data abstraction model component 132 is provided for each separate physical data representation 214.

Any number of access methods is contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $201_1$ ("FirstName") to a column named "f_name" in a table named "contact". The field specification $208_3$ exemplifies a filtered field access method $212_3$. Filtered fields identify an associated physical entity and provide filters used to define a particular subset of items within the physical data representation. An example is provided in FIG. 2B in which the filtered field access method $212_3$ maps the logical field name $210_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2B the composed field access method $212_4$ maps the logical field name $210_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case a conversion of the underlying physical data into the format of the logical field is required.

By way of example, the field specifications 208 of the data abstraction model component 132 shown in FIG. 2 are representative of logical fields mapped to data represented in the relational data representation $214_2$. However, other instances of the data abstraction model component 132 map logical fields to other physical data representations, such as XML. In one embodiment, the data abstraction model 132 is used by the runtime component 134 to transform the abstract query 202 into a concrete query having a form consistent with the physical representation of the data represented in the relational data representation $214_2$. The runtime component 134 then executes the concrete query against the underlying relational database in order to determine a corresponding query result for the abstract query 202.

An illustrative abstract query corresponding to the abstract query 202 shown in FIG. 2B is shown in Table I below. By way of illustration, the illustrative abstract query is defined using XML. However, any other language may be used to advantage.

TABLE I

| ABSTRACT QUERY EXAMPLE |
| --- |

| | |
| --- | --- |
| 001 | <?xml version="1.0"?> |
| 002 | <!--Query string representation: (FirstName = "Mary" AND LastName = |
| 003 | "McGoon") OR State = "NC"--> |
| 004 | <QueryAbstraction> |
| 005 |    <Selection> |
| 006 |       <Condition internalID="4"> |
| 007 |          <Condition field="FirstName" operator="EQ" value="Mary" |
| 008 |             internalID="1"/> |
| 009 |          <Condition field="LastName" operator="EQ" value="McGoon" |

TABLE I-continued

ABSTRACT QUERY EXAMPLE

| | |
|---|---|
| 010 | internalID="3" |
| | relOperator="AND"></Condition> |
| 011 | </Condition> |
| 012 | <Condition field="State" operator="EQ" value="NC" internalID="2" |
| 013 | relOperator="OR"></Condition> |
| 014 | </Selection> |
| 015 | <Results> |
| 016 | <Field name="FirstName"/> |
| 017 | <Field name="LastName"/> |
| 018 | <Field name="State"/> |
| 019 | </Results> |
| 020 | </QueryAbstraction> |

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, a results specification is a list of abstract fields that are to be returned as a result of query execution. A result specification in the abstract query may consist of a field name and sort criteria.

An illustrative data abstraction model (DAM) corresponding to the data abstraction model 132 shown in FIG. 2B is shown in Table II below. By way of illustration, the illustrative data abstraction model is defined using XML. However, any other language may be used to advantage.

TABLE II

DATA ABSTRACTION MODEL EXAMPLE

| | |
|---|---|
| 001 | <?xml version="1.0"?> |
| 002 | <DataAbstraction> |
| 003 | <Category name="Demographic"> |
| 004 | <Field queryable="Yes" name="FirstName" displayable="Yes"> |
| 005 | <AccessMethod> |
| 006 | <Simple columnName="f_name" tableName="contact"></Simple> |
| 007 | </AccessMethod> |
| 008 | <Type baseType="char"></Type> |
| 009 | </Field> |
| 010 | <Field queryable="Yes" name="LastName" displayable="Yes"> |
| 011 | <AccessMethod> |
| 012 | <Simple columnName="l_name" tableName="contact"></Simple> |
| 013 | </AccessMethod> |
| 014 | <Type baseType="char"></Type> |
| 015 | </Field> |
| 016 | <Field queryable="Yes" name="State" displayable="Yes"> |
| 017 | <AccessMethod> |
| 018 | <Simple columnName="state" tableName="contact"></Simple> |
| 019 | </AccessMethod> |
| 020 | <Type baseType="char"></Type> |
| 021 | </Field> |
| 022 | </Category> |
| 023 | </DataAbstraction> |

By way of example, note that lines 004-009 correspond to the first field specification $208_1$ of the DAM 132 shown in FIG. 2B and lines 010-015 correspond to the second field specification $208_2$.

Figure 3A:
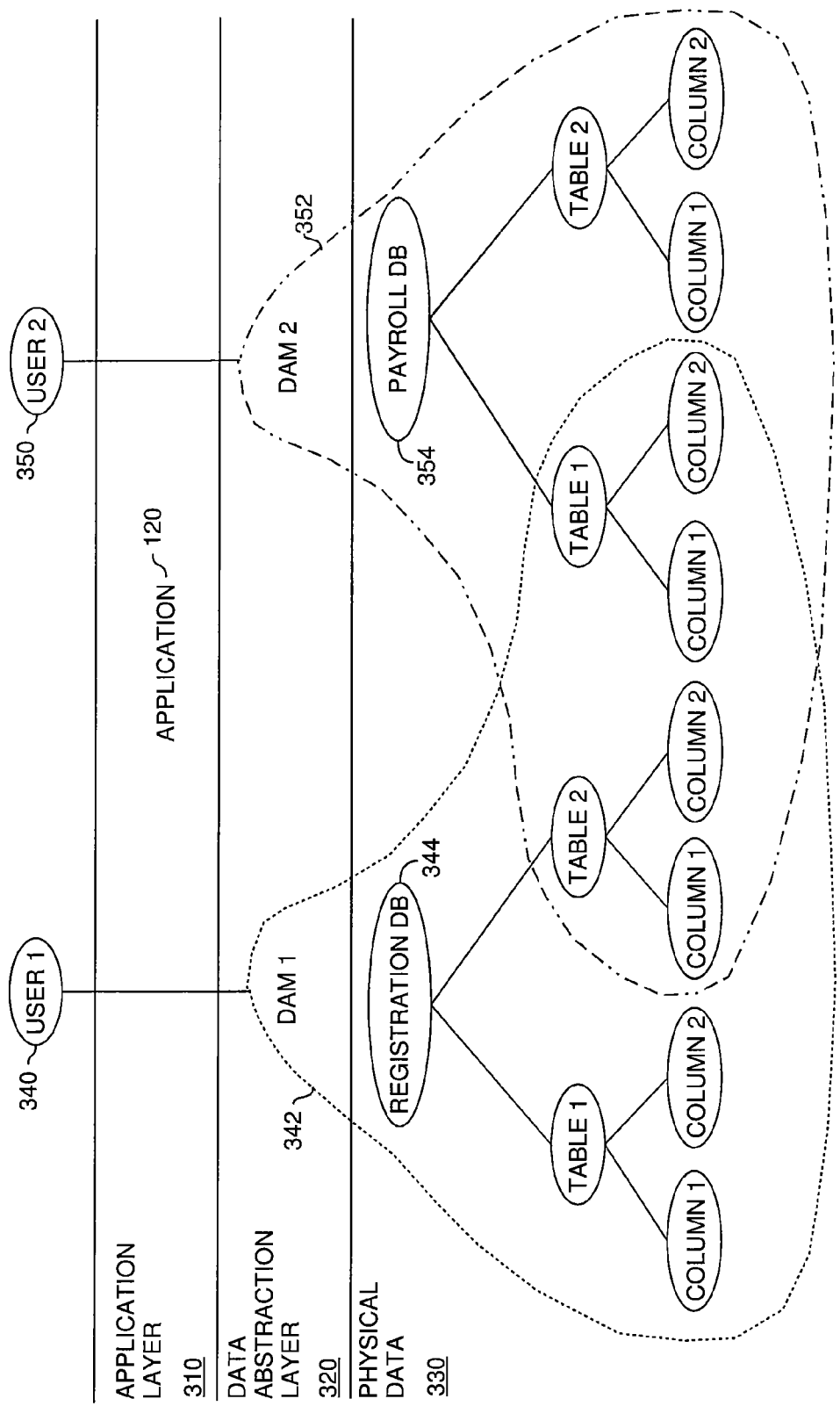
FIG. 3A illustrates one embodiment in which multiple data abstraction models coexist in a single application space.

As noted above, one embodiment provides multiple data abstraction model components which coexist in a single application space. One embodiment illustrating such an environment is shown in FIG. 3A. The environment shown in FIG. 3A generally comprises an application layer 310 (defined by the application 120 of FIG. 1), a data abstraction layer 320, and a physical data layer 330. The environment shows two users 340 "USER 1" and 350 "USER 2" accessing the physical data layer 330 via the application layer 310 using, e.g., application 120 of FIG. 1 (e.g., by issuing abstract query 202 of FIG. 2). Accordingly, the application layer 310 may comprise a data query builder component adapted to enable the users to build abstract queries.

The users 340, 350 are accessing the same physical data layer 330 through a common application layer 310. However, the data being exposed to the respective users 340, 350 is not the same. Rather, each user is exposed to selected portions of the physical data layer 330 according to the definition of the data abstraction layer 320. More particularly, the data abstraction layer 320 illustratively includes two data abstraction model components, DAM1 342 and DAM2 352, which define the data that will be exposed to the users 340, 350, respectively, via the application layer 310. The data abstraction layer 320 may comprise a data query abstraction component which services logical data access of the data query builder component to the physical data in physical data layer 330.

In the present example, the first data abstraction model 342 (DAM1) exposes all of a first database 344 "REGISTRATION DATABASE" and TABLE 1 of a second database 354 "PAYROLL DATABASE", while the second data abstraction model 352 (DAM2) exposes the entire second database 354 and TABLE 2 of the first database 344. It should be noted that the particular data exposed by the respective data abstraction model components is merely illustrative. More generally, any portion of the databases 344, 354 may be exposed, as well as any other databases of the physical data layer 330. By way of illustration, the environment of FIG. 3A shows two users (340, 350). However, more generally any number of users may be accessing the data of the physical data layer 330.

Figure 3B:
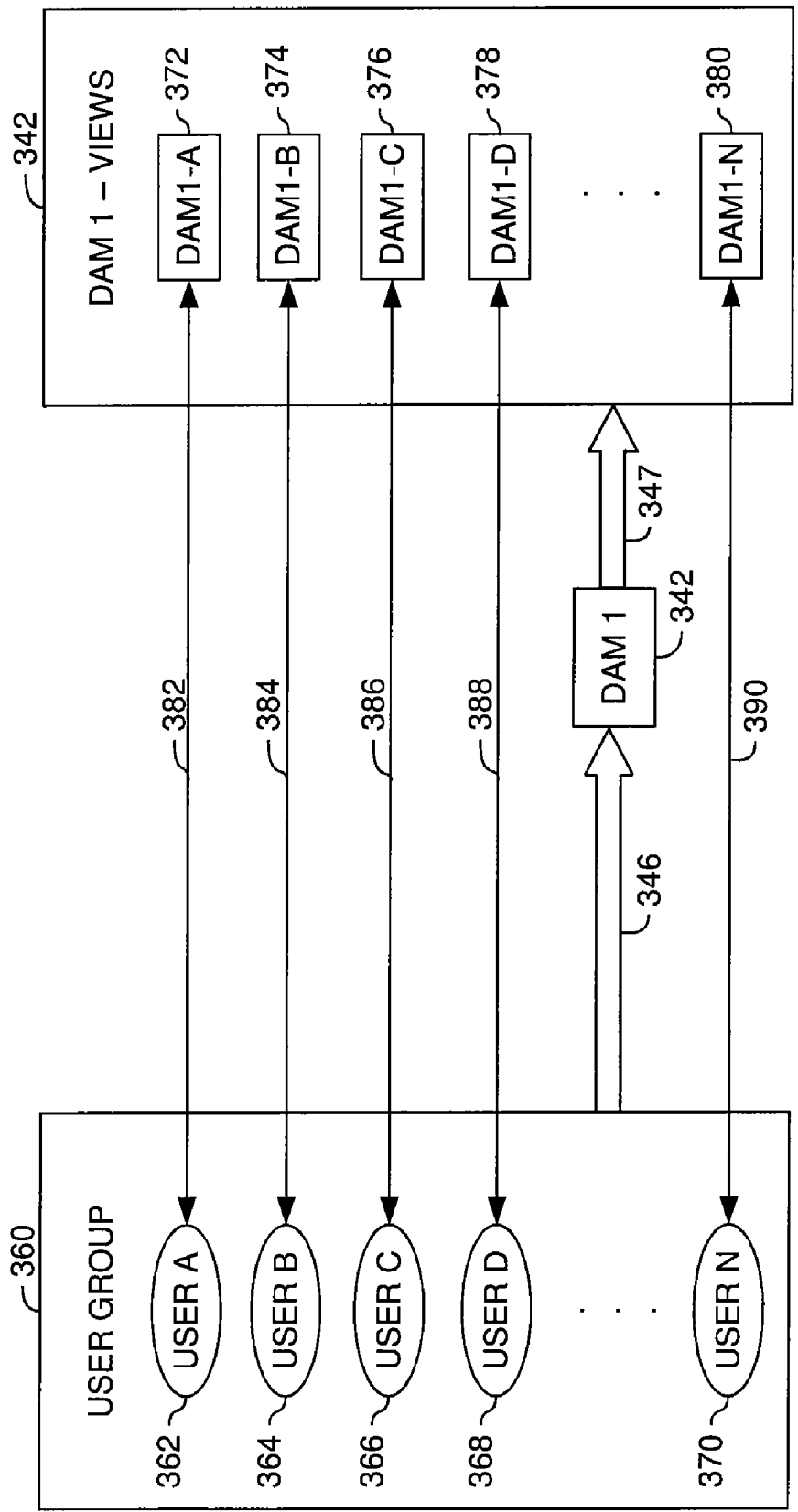
FIG. 3B illustrates one embodiment in which multiple instances of a single data abstraction model coexist in a single application space.

Referring now to FIG. 3B, an embodiment is illustrated in which multiple instances of a given data abstraction model (e.g., data abstraction model 132 of FIG. 1) coexist in a single application space. Specifically, the multiple instances coexist independent of whether only the given data abstraction model or one or more other data abstraction models exist in the single application space. By way of example, a group 360 of users accesses the data abstraction model 342 "DAM1" of FIG. 3A, as illustrated by arrow 346. Illustratively, the group 360 of users includes five users, a user 362 "USER A", 364 "USER B", 366 "USER C", 368 "USER D", and 370 "USER N".

For each user 362, 364, 366, 368, 370 accessing the data abstraction model 342, an instance of the data abstraction model 342 is created (as indicated by arrow 347). Each instance defines a specific view of the data abstraction model 342 for a given user. Providing such a specific view of the data abstraction model 342 to each user allows adapting the data abstraction model 342 to the needs and specific requirements of the user without globally changing the data abstraction model 342 for all users in the group 360. In one embodiment, the various instances of a given DAM are created by imposing a filter (or "view") over the given DAM, thereby exposing selected portions the DAM. In some embodiments, the filter may in fact redefine attributes of the exposed DAM. Examples of these and other aspects follow.

Illustratively, a group 348 of data abstraction model instances 372 "DAM1-A", 374 "DAM1-B", 376 "DAM1-C", 378 "DAM1-D" and 380 "DAM1-N" defining different views of the DAM 342 is generated. The DAM instances 372, 374, 376, 378 and 380 are generated for the users 362, 364, 366, 368 and 370, respectively, as indicated by arrows 382, 384, 386, 388 and 390. By way of example, assume that the DAM instance 372 "DAM1-A" shows all logical fields as defined in the data abstraction model 342 to the user 362. The DAM instance 374 "DAM1-B" hides a logical field related to COLUMN 1 of TABLE 1 of the database 344 to the user 364, but shows all remaining logical fields as defined in the data abstraction model 342. The DAM instance 376 "DAM1-C" shows all logical fields of the data abstraction model 342 to the user 366, but a logical field related to COLUMN 2 of TABLE 1 of the database 344 is redefined. More specifically, assume that the logical field related to COLUMN 2 of TABLE 1 is originally defined in the data abstraction model 342 as a New York ZIP code field that maps to a physical representation of ZIP codes and restricts the data only to those ZIP codes defined for the state of New York. Assume further that the redefined field restricts the data to ZIP codes defined for the state of Minnesota (MN). Furthermore, the DAM instance 378 "DAM1-D" shows all logical fields as defined in the data abstraction model 342 and additionally shows a logical field related to COLUMN 1 of TABLE 2 of the database 354 to the user 368. Assume finally that the DAM instance 380 "DAM1-N" hides a logical field related to COLUMN 2 of TABLE 1 of the database 344 to the user 370, but shows all remaining logical fields as defined in the data abstraction model 342 and additionally shows a logical field related to COLUMN 2 of TABLE 2 of the database 354.

Figure 3C:
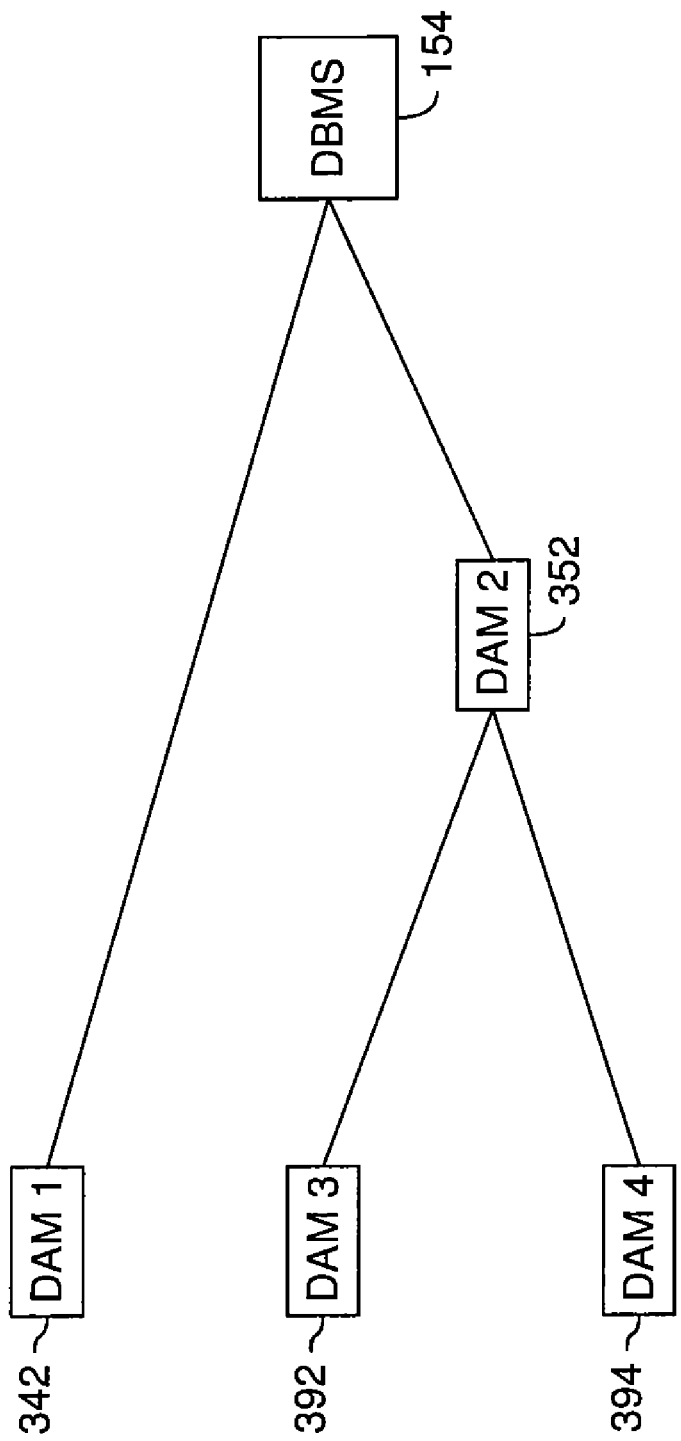
FIG. 3C illustrates an environment with plural data abstraction models.

As noted above, multiple data abstraction models may coexist in a single application space. Furthermore, multiple instances of a given data abstraction model may coexist in a single application space. Moreover, in one embodiment different data abstraction models may reference one another. An exemplary embodiment in which a plurality of data abstraction models reference one another is illustrated in FIG. 3C. Specifically, the second data abstraction model DAM2 352 of FIG. 3A is illustrated as a parent with respect to a third data abstraction model DAM3 392 (a child) and a fourth data abstraction model DAM4 394. In this relationship, the third and/or fourth data abstraction models DAM3 392 and DAM4 394 may inherit a portion of the definition of the second data abstraction model DAM2 352. In more detail, a portion of the logical fields provided in the second data abstraction model DAM2 352, which is not included with the third and/or fourth data abstraction models DAM3 392 and DAM4 394 may be included therein by inheritance. Alternatively, the third and/or fourth data abstraction models DAM3 392 and DAM4 394 may override portions of the second data abstraction model DAM2 352 and/or include additional definitions, e.g., logical fields not found in the second data abstraction model DAM2 352. Still alternatively, the second data abstraction model DAM2 352 may be constructed by a combination of the definitions and/or logical fields comprised in the third and fourth data abstraction models DAM3 392 and DAM4 394.

As was noted above, the abstract query of Table I can be transformed into a concrete query for query execution. An exemplary method for transforming an abstract query into a concrete query is described below with reference to FIGS. 4-5.

Transforming an Abstract Query into a Concrete Query

Figure 4:
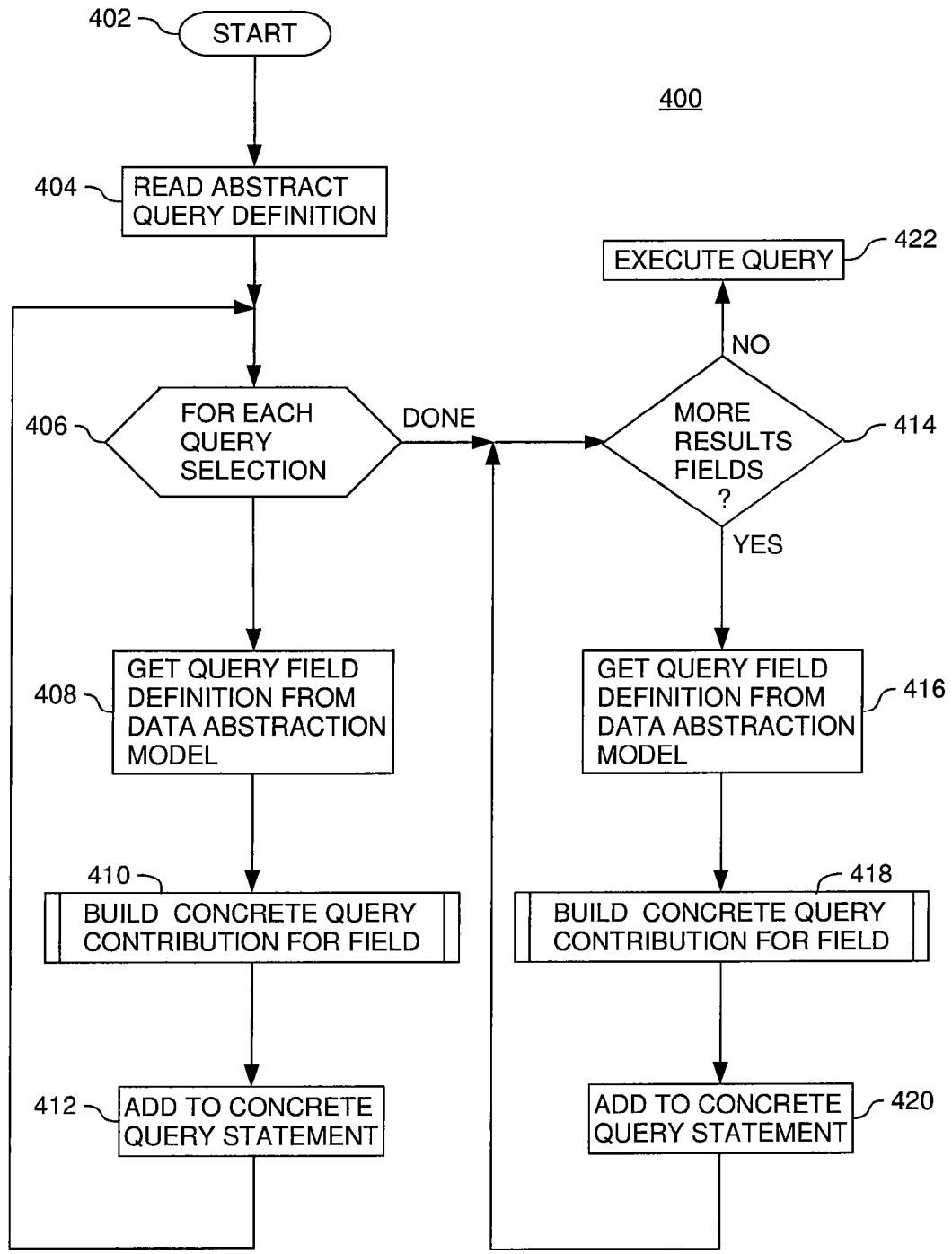
FIGS. 4-5 are flow charts illustrating the operation of a runtime component.

Referring now to FIG. 4, an illustrative runtime method 400 exemplifying one embodiment of the operation of the runtime component 134 of FIG. 1 is shown. The method 400 is entered at step 402 when the runtime component 134 receives as input an abstract query (such as the abstract query shown in Table I). At step 404, the runtime component 134 reads and parses the abstract query and locates individual selection criteria and desired result fields. At step 406, the runtime component 134 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 134 uses the field name from a selection criterion of the abstract query to look up the definition of the field in the data abstraction model 132. As noted above, the field definition includes a definition of the access method used to access the data structure associated with the field. The runtime component 134 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 134 looks up a result field name (from the result specification of the abstract query) in the data abstraction model 132 and then retrieves a result field definition from the data abstraction model 132 to identify the physical location of data to be returned for the current logical result field. The runtime component 134 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
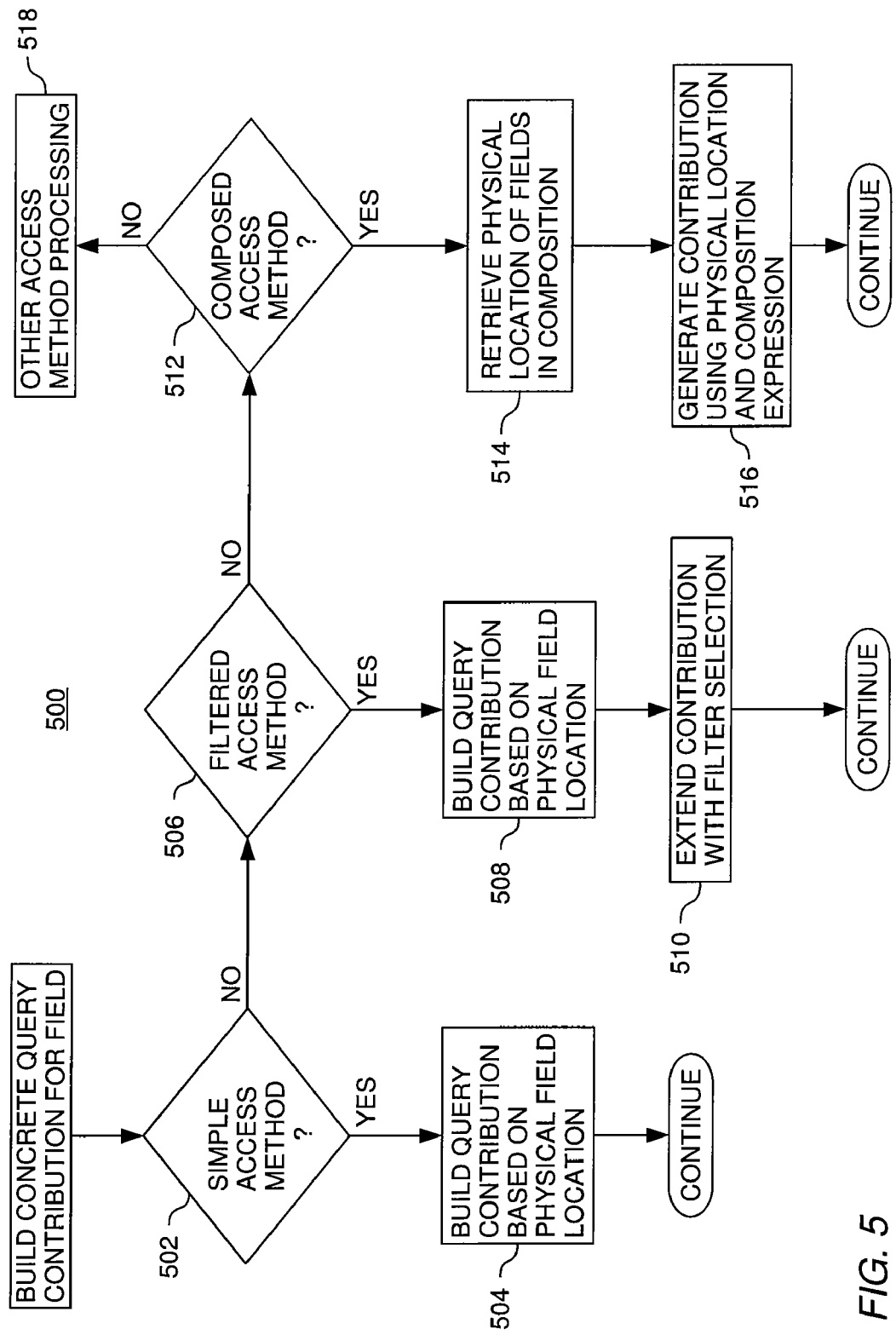

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As was noted above, if a given data object such as a logical field is modified, an interdependency between the given data object and one or more dependent data objects may present a possible undesired consequence. The given data object and the one or more dependent data objects are managed by an object modifications management component (e.g., object modifications management component 150 of FIG. 1) with respect to the modification(s) of the given data object. Operation of an exemplary object modifications management component is described below with reference to FIGS. 6-8.

An Exemplary Object Modifications Management Environment

Figure 6:
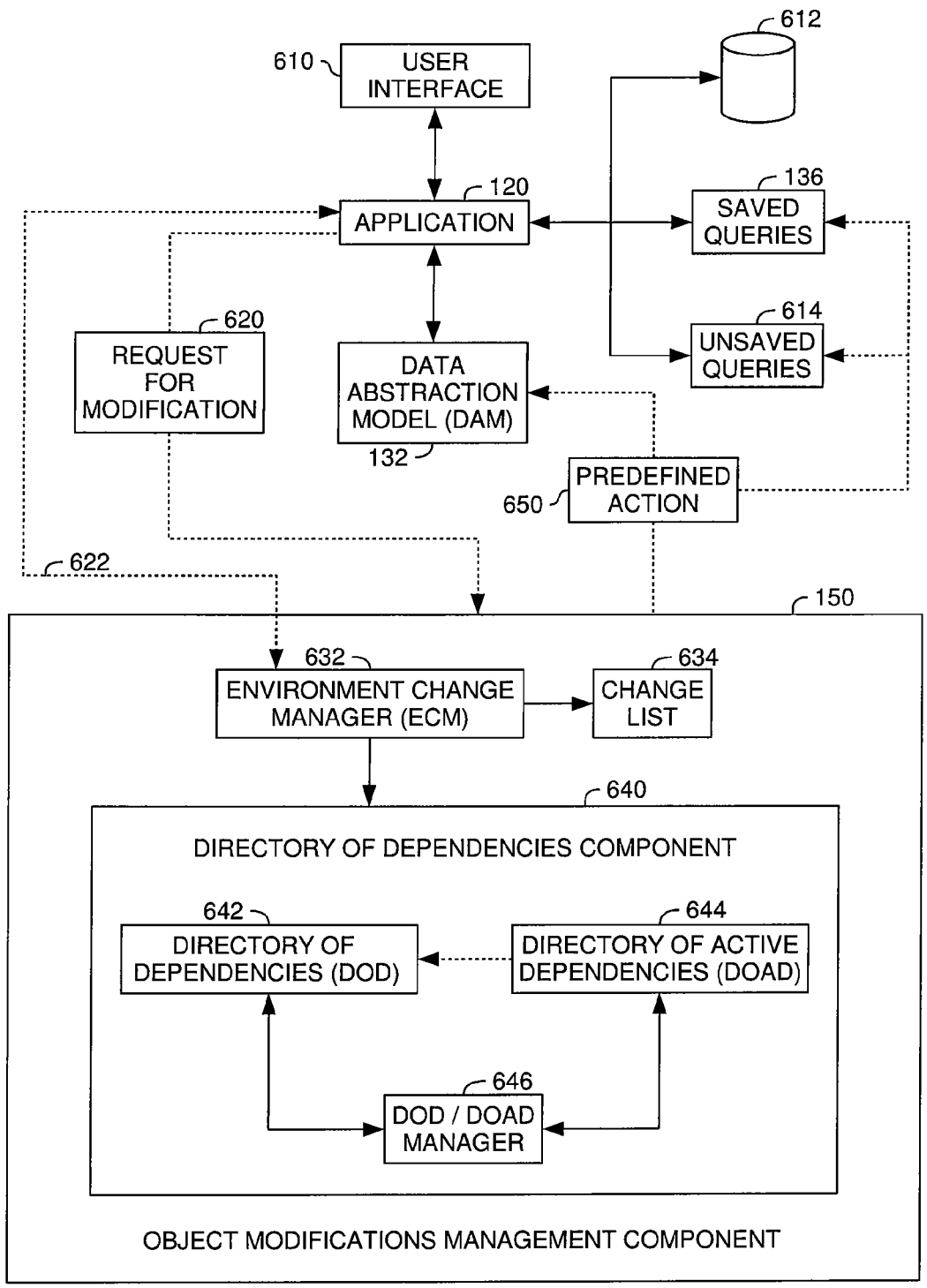
FIG. 6 is a relational view of software components in one embodiment.

Referring now to FIG. 6, a relational view of components implementing one aspect of the invention is illustrated. The components illustratively include the application(s) 120, the data abstraction model 132, the saved queries 136 and the object modifications management component (OMMC) 150 of FIG. 1. The components further include a user interface 610, a database 612 and unsaved queries 614.

In one embodiment, the application 120 issues a request for modification 620 of the data abstraction model 132 and/or one or more logical fields thereof. The request 620 is received by the OMMC 150. According to one aspect, the request 620 can be created by a user accessing the application 120 using the user interface 610. The requested modification may affect one or more dependent data objects, i.e., data objects using the data abstraction model 132 and/or the one or more logical fields thereof. For instance, the requested modification may affect abstract queries which are created on the basis of the one or more logical fields. The abstract queries can be stored persistently with the saved queries 136 or cached with the unsaved queries 614 during creation. The OMMC 150 identifies the dependent data object(s) and performs a predefined action(s) 650. In one embodiment, the OMMC 150 issues a message to a user indicating the effect(s) of performing the requested modification. If the user approves the indicated effect(s), the user may instruct the OMMC 150 to perform the predefined action 650. For instance, the OMMC 150 performs the requested modification on the data abstraction model 132 and/or the one or more logical fields thereof, and deletes the identified dependent data object(s).

The request 620 is generally a request which either explicitly or implicitly specifies a requested modification of the data abstraction model 132 and/or the one or more logical fields thereof. For instance, the application 120 explicitly requests to: (i) delete a given logical field, (ii) rename the given logical field, or (iii) change one or more attributes of the given logical field of the data abstraction model 132. Such a request type is hereinafter referred to as an explicit request for modification. In another embodiment, the request 620 corresponds to an event which results in a modification of the data abstraction model 132 and/or the one or more logical fields thereof, but which is not an explicit request for the modification(s). Such an event is hereinafter referred to as an implicit request for the modification(s). An exemplary event representing an implicit request is a change of roles of a given user, whereby a corresponding view of the underlying data abstraction model 132 is changed. For instance, assume that the given user uses the application 120 to create an abstract query on the basis of the data abstraction model 132. To this end, the given user uses the user interface 610 to specify logical fields of the data abstraction model 132 which are required as result and/or condition fields of the abstract query. Assume further that the given user creates the abstract query in a first role, wherein a first specific view (e.g., DAM instance 372 of FIG. 3B) of the data abstraction model 132 is presented to the given user. The created abstract query is stored with the saved queries 136. Then, the given user changes the role to a second role, wherein a second specific view (e.g., DAM instance 374 of FIG. 3B) of the data abstraction model 132 is presented to the given user. In the second role, the given user wishes to retrieve the created abstract query for execution against the database 612. Assume now that the specified logical fields of the created abstract query are different in the second specific view so that the created query is invalid in the second role. For instance, one of the specified logical fields defining a condition field of the abstract query is not accessible by the given user in the second role. Accordingly, changing the role from the first to the second role can be treated as a modification of the data abstraction model 132 and/or the specified logical fields without an explicit request for the modification(s). Thus, changing the role is referred to herein as an implicit request for modification. However, it should be noted that a change of roles is merely described as an example of an implicit request and that other implicit requests for modifications are possible and broadly contemplated. For instance, a change from a first to a second user, each having different associated authorizations, can also be treated as an implicit request for modification of the data abstraction model 132 and/or logical fields thereof.

The OMMC 150 illustratively includes an environment change manager (ECM) 632, a change list 634 and a directory of dependencies component 640. When the OMMC 150 receives the request 620, the ECM 632 inserts a description of the requested modification into the change list 634. By way of example, if the requested modification is a deletion of a logical field "FirstName" (e.g., logical field $208_1$ of FIG. 2A) of a corresponding data abstraction model "DAM Demographic" (e.g., data abstraction model 132 of FIG. 2A), an entry "DELETE First Name FROM DAM Demographic" is created in the change list 634. However, it should be noted that entries in the change list 634 can be created in any suitable computer-readable language. Thus, the format of the entries in the change list 634 is not limited to a specific format or computer-readable language.

In one embodiment, the ECM 632 identifies the data object which is to be modified from the received request for modification. In the given example, the ECM 632 identifies the logical field "FirstName" from the request 620. The ECM 632 then accesses the directory of dependencies component 640 in order to determine interdependencies between the identified data object and corresponding dependent data objects.

The directory of dependencies component 640 illustratively includes a directory of dependencies (DOD) 642 and a directory of active dependencies (DOAD) 644. In one embodiment, the DOD 642 and the DOAD 644 are database tables that are configured to itemize dependencies between interdependent data objects. More specifically, the DOD 642 and the DOAD 644 include records for each data object having an interdependency with another data object. According to one aspect, the DOD 642 relates to data objects which are persistently stored and the DOAD 644 relates to data objects which are not persistently stored, as described in more detail below. An exemplary DOD table is shown in Table III below.

TABLE III

EXEMPLARY DOD TABLE

| 001 | ITEM | ITEM_TYPE | OBJECT | OBJECT_TYPE | USE |
|---|---|---|---|---|---|
| 002 | Payroll | Query | Age | Field | Condition |
| 003 | Payroll | Query | Name | Field | Output |
| 004 | Name | Field | FirstName | Field | Create |
| 005 | Name | Field | LastName | Field | Create |
| 006 | OldPayroll | Query | B | Field | Output |
| 007 | OldPayroll | Query | C | Field | Output |
| 008 | OldPayroll | Query | D | Field | Output |
| 009 | PayrollDec02 | Results | A | Field | Output |
| 010 | PayrollDec02 | Results | C | Field | Output |
| 011 | PayrollDec02 | Results | Payroll | Query | Create |

Illustratively, the exemplary DOD table shown in Table III includes five columns, "ITEM", "ITEM_TYPE", "OBJECT", "OBJECT_TYPE" and "USE". The first column "ITEM" contains information which is suitable for uniquely identifying a corresponding data object. By way of example, lines 002-003 are related to a data object "Payroll", lines 004-005 are related to a data object "Name", lines 006-008 are related to a data object "OldPayroll", and lines 009-011 are related to a data object "PayrollDec02". The second column "ITEM_TYPE" contains information which describes types of corresponding data objects identified in the first column. By way of example, the data objects "Payroll" and "OldPayroll" are query objects ("Query" in lines 002-003 and 006-008), the data object "Name" is a logical field ("Field" in lines 004-005), and the data object "PayrollDec02" is a result object ("Results" in lines 009-011). In one embodiment, the queries "Payroll" and "OldPayroll" are abstract queries that are stored as persistent data objects with the saved queries 136. The result set "PayrollDec02" is a query result which is, for instance, stored as persistent data object in the database 612. The third column "OBJECT" contains information which is suitable for uniquely identifying data objects having interdependencies with the data objects identified in the first column "ITEM". By way of example, lines 002-011 are related to data objects "Age", "Name", "FirstName", "LastName", "B", "C", "D", "A", "C" and "Payroll", respectively. Specifically, the data objects "Age" and "Name" have interdependencies with the abstract query "Payroll" (lines 002-003). The data objects "FirstName" and "LastName" have interdependencies with the logical field "Name" (lines 004-005). The data objects "B", "C", "D" have interdependencies with the abstract query "OldPayroll" (lines 006-008). The data objects "A", "C" and "Payroll" have interdependencies with the result set "PayrollDec02" (lines 009-011) The fourth column "OBJECT_TYPE" contains information which describes object types of corresponding data objects identified in the third column. By way of example, the data objects "Age", "Name", "FirstName", "LastName", "B", "C", "D", "A" and "C" are logical fields ("Field" in lines 002-010) and the data object "Payroll" is a query object ("Query" in line 011), i.e., the "Payroll" query of lines 002-005. The fifth column "USE" contains information which describes how data objects identified in the third column are used with respect to the corresponding data objects of the first column "ITEM". By way of example, the logical field "Age" is used as condition field in the abstract query "Payroll" ("Condition" in line 001). The logical fields "Name", "B", "C", "D", "A" and "C" are used as result fields in the corresponding abstract queries identified in the first column ("Output" in lines 003-010). The logical fields "FirstName" and "LastName" are used to create the logical field "Name" ("Create" in lines 004-005) and the abstract query "Payroll" is used to create the query result "PayrollDec02" ("Create" in line 011).

It should be noted that the logical field "Name", which is used as a result field in the abstract query "Payroll" according to line 003 of Table III, defines a composed field (e.g., logical field $208_4$ of FIG. 2B). As can be seen from lines 004-005 of Table III, the composed field "Name" is composed of two logical fields, i.e., the logical fields "FirstName" (e.g., logical field $208_1$ of FIG. 2B) and "LastName" (e.g., logical field $208_2$ of FIG. 2B). Accordingly, if a modification of the logical field "FirstName" and/or the logical field "LastName" is requested, it can be determined from the DOD table of Table III that the composed logical field "Name" can be affected by the requested modification.

It should further be noted that the illustrated number of columns and column attributes, i.e., columns of the exemplary DOD table of Table III can be defined based on system and/or user-specific requirements. For instance, an additional attribute may collect information indicating when only specific values are allowed. For example, a Field for Race might allow White, Black, Asian, etc. However, some roles or scenarios might limit the number of choices that are available to a user. By tracking the values used for logical fields in conditions in another column, the DOD can be used to determine if a query condition is still valid.

The DOAD 644 has a form which is similar to the form of the DOD 642, but which is directed towards data objects which are not persistently stored. For instance, the DOAD 644 can include a record for each data object having an interdependency with another data object which is under construction. Accordingly, an abstract query which is cached with the unsaved queries 614 as long as it is under construction is tracked in the DOAD 644.

The DOD 642 and the DOAD 644 are managed by a DOD/DOAD manager 646. The DOD/DOAD manager 646 creates, deletes and/or updates records in the DOD 642 and the DOAD 644. For instance, if, during a current user session, an abstract query is constructed using five logical fields from the data abstraction model 132 as result and/or condition fields, the DOD/DOAD manager 646 creates five records for the abstract query under construction in the DOAD 644, one record with respect to each selected logical field. If, subsequently, additional logical fields are added to the abstract query under construction, the DOD/DOAD manager 646 creates additional records in the DOAD 644. When construction of the abstract query is completed, e.g., by persistently storing the abstract query with the saved queries 136, the DOD/DOAD manager 646 transfers all records which have been created in the DOAD 644 for the abstract query to the DOD 642. If, subsequently, the persistently stored abstract query is modified and/or the logical fields used by the abstract query are deleted from the underlying data abstraction model, the DOD/DOAD manager 646 updates the DOD 642 accordingly.

As was noted above, the ECM 632 accesses the directory of dependencies component 640 in order to determine interdependencies between the identified data object, for which the modification is requested, and corresponding dependent data objects. In this way, the ECM 632 identifies the corresponding dependent data objects from the DOD 642 and/or the DOAD 644 and creates an entry for each identified dependent data object in the change list 634. On the basis of the change list 634, the ECM 632 performs the predefined action 650.

It should be noted that use of a single change list, i.e., change list 634, has been described for simplicity. However, in alternative implementations more than one list is used. For instance, the change list 634 can be used to itemize requested modifications, and another list can be used to itemize dependent data objects. Accordingly, such alternative implementations are broadly contemplated.

In one embodiment, the ECM 632 requests instructions with respect to the predefined action 650 from the application 120, as indicated by dashed arrow 622. For instance, the ECM 632 provides the change list 634 to the application 120. Thus, the application 120 can prompt the user via the user interface 610 to indicate which actions are to be performed with respect to the data abstraction model 132 and/or the specified logical fields, and the identified dependent data object(s). In another embodiment, the application 120 programmatically selects the predefined action 650. The application 120 then provides instructions identifying the predefined action 650 to the ECM 632, which performs the predefined action 650 as specified by the application 120. In another embodiment, the ECM 632 programmatically selects and performs the predefined action 650. An exemplary operation and interaction of the application 120, the user interface 610 and the OMMC 150 is described in more detail below with reference to FIGS. 7-8.

Managing Interdependent Data Objects

Figure 7:
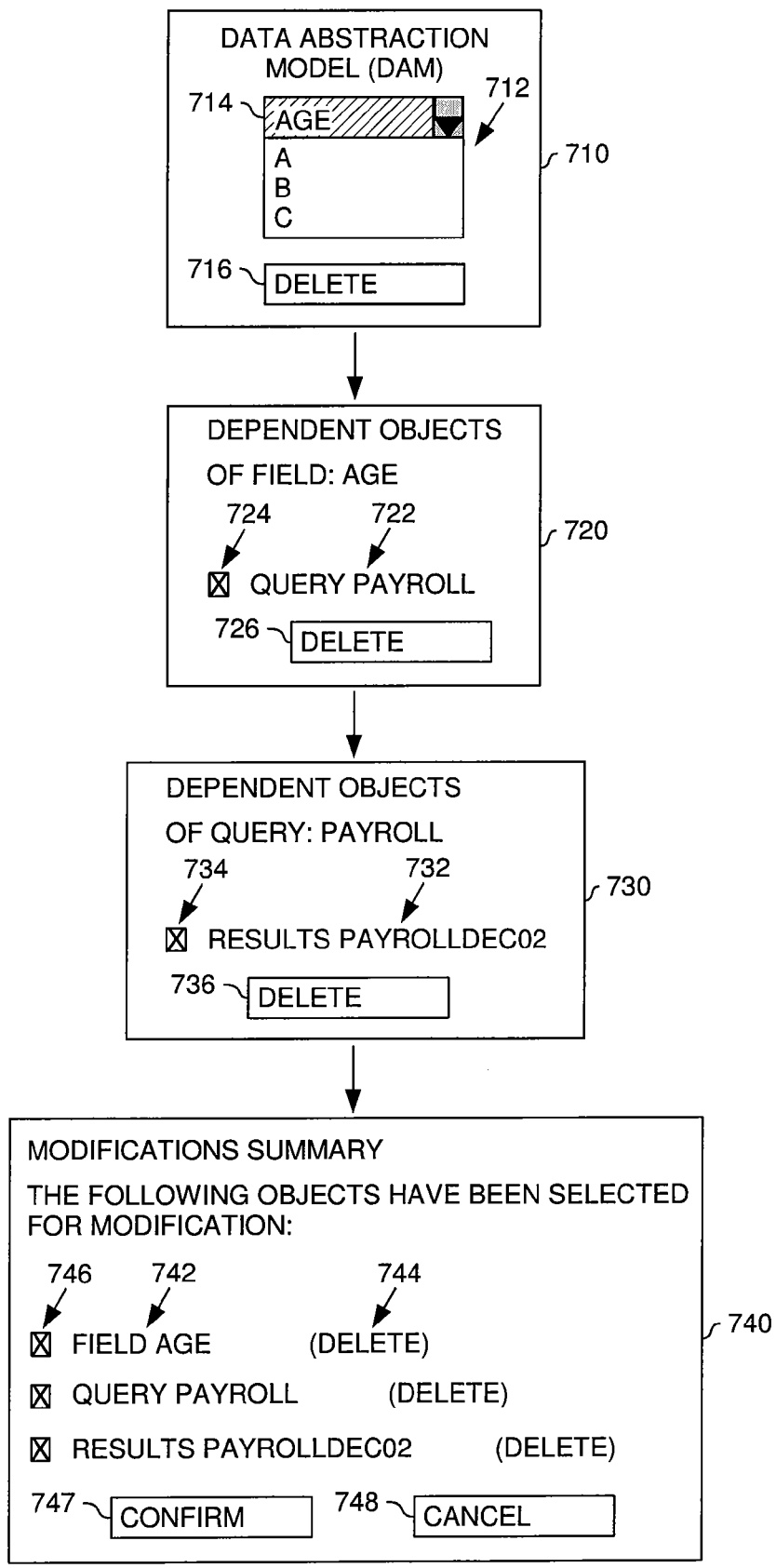
FIG. 7 illustrates screen shots of a user interface in one embodiment.

Referring now to FIG. 7, a series of user interface screens 710-740 illustrating an exemplary modification process for managing a requested modification to a data abstraction model (e.g., data abstraction model 132 of FIG. 6) is shown. In one embodiment, the series of user interface screens 710-740 is displayed in a suitable user interface (e.g. user interface 610 of FIG. 6).

By way of example, the modification process described with reference to FIG. 7 is performed in response to an explicit request (e.g., request 620 of FIG. 6) for the modification(s). The explicit request is created by a user during a data abstraction model modification session (hereinafter referred to as "DAM modification session", for brevity) using the suitable user interface. The modification process starts when the user initiates the DAM modification session. To this end, the user may invoke a suitable data abstraction model modification tool (e.g., application 120 of FIG. 6) which allows the user to perform modifications on the underlying data abstraction model In response to the initiation of the DAM modification session, the data abstraction model modification tool (hereinafter referred to as "DAM modification tool", for brevity) displays the user interface screen 710 in the suitable user interface. The user interface screen 710 displays user-selectable elements. A first portion of the user-selectable elements represents logical fields of the underlying data abstraction model. By way of example, the user interface screen 710 displays a drop-down menu 712 having a plurality of selectable items, each corresponding to a logical field of the underlying data abstraction model. Assume now that the user wants to select the logical field "Age". In this case, the user selects the menu item 714 "AGE", which is illustratively hatched as a visual confirmation of the selection.

A second portion of the user-selectable elements allows the user to specify the requested modification. By way of example, one user-selectable element may allow the user to specify a request for editing the selected logical field "Age". Thus, the user can specify or change attributes and/or definitions of the selected logical field and/or rename the selected logical field. Another user-selectable element may allow the user to specify a request for deletion of the selected logical field. However, it should be noted that any suitable modification is broadly contemplated.

Illustratively, the user clicks on a pushbutton 716 "DELETE" to delete the "Age" field from the data abstraction model. After pushing the pushbutton 716, the DAM modification tool creates a request for deletion of the logical field "Age" and transmits the request to a suitable OMMC (e.g., OMMC 150 of FIG. 6) having an ECM (ECM 632 of FIG. 6).

In one embodiment, the ECM determines interdependencies between the selected logical field "Age" and corresponding dependent data objects. To this end, the ECM generates and executes a first query against a corresponding DOD and/or DOAD table (e.g., DOD 642 and DOAD 644 of FIG. 6). The first query is configured to determine the interdependencies and to identify the dependent data objects. An exemplary first query is shown in Table IV below. By way of example, the exemplary first query of Table IV is described in SQL. However, specifying the exemplary first query of Table IV below in SQL is not intended to limit the invention accordingly. Instead, it is understood that any suitable query language, known or unknown, can be used to create the query of Table IV. Furthermore, the exemplary first query is only specified for execution against a DOD table, i.e., the DOD table of Table III above, for simplicity. However, a person skilled in the art will recognize that the exemplary first query can be modified for execution against a DOAD and/or a DOD and a DOAD table. For example, in the case of an SQL query, a UNION clause may be used for this purpose.

TABLE IV

FIRST QUERY EXAMPLE

| | |
|---|---|
| 001 | SELECT ITEM, ITEM_TYPE |
| 002 | FROM DOD |
| 003 | WHERE OBJECT = 'Age' AND OBJECT_TYPE = 'Field' |

Illustratively, the exemplary first query shown in Table IV includes data selection criteria in line 001. The data selection criteria include a result field specification which specifies two result fields for which information is to be returned in the query result. Specifically, the result fields "ITEM" and "ITEM_TYPE" are specified. However, it should be noted that other result fields can be specified dependent on system and user requirements. The exemplary first query further includes a specification of the database table which contains the specified result fields (line 002), i.e., the DOD table of Table III above. Moreover, the exemplary first query includes data selection criteria in line 003. The data selection criteria indicate that all data records in the DOD table of Table III which are related to the logical field "Age" (OBJECT='Age' AND OBJECT_TYPE='Field') should be retrieved.

In the given example, the exemplary first query of Table IV leads to a first query result. According to line 002 of Table III, the first query result includes the query "Payroll" which is, for example, stored with a plurality of persistently stored queries (e.g., saved queries 136 of FIG. 6). The ECM returns the first query result to the DAM modification tool which generates and displays the user interface screen 720. The user interface screen 720 displays a summarizing display section 722 which summarizes the first query result. Illustratively, the summarizing display section 722 indicates that the query "Payroll" is dependent of the logical field "Age".

In one embodiment, the user interface screen 720 allows the user to specify a predefined action to be taken on the query "Payroll". To this end, the user may click on a checkbox 724 to select the query "Payroll" and then select a user-selectable element associated with the requested predefined action. By way of example, the user clicks on a pushbutton 726 "DELETE" to request for deletion of the "Payroll" query. However, it should be noted that deletion of the "Payroll" query is merely described by way of example and not intended to limit the invention accordingly. In other words, various predefined actions can be specified by the user, including for example, disabling access to the query "Payroll" and hiding the query to the user. Furthermore, these predefined actions can be refined to modify the "Payroll" query on the basis of the use of the "Age" field in the query. For instance, if the "Age" field is only used as a result field in the abstract query "Payroll" with multiple other logical fields, the "Age" field can be removed from the query. Thus, the modified query is a valid query that needs not be deleted. Thus, such various predefined actions are broadly contemplated.

After pushing the pushbutton 726, the DAM modification tool creates a request for deletion of the query "Payroll" and transmits the request to the OMMC, i.e., the ECM. The ECM determines interdependencies between the query "Payroll" and corresponding dependent data objects. To this end, the ECM generates and executes a second query against the DOD of Table III. An exemplary second query is shown in Table V below. By way of example, the exemplary second query of Table V is described in SQL. However, specifying the exemplary second query of Table V below in SQL is not intended to limit the invention accordingly and it is understood that any suitable query language, known or unknown, can be used to create the query of Table V.

TABLE V

SECOND QUERY EXAMPLE

| | |
|---|---|
| 001 | SELECT ITEM, ITEM_TYPE |
| 002 | FROM DOD |
| 003 | WHERE OBJECT = 'Payroll' AND OBJECT_TYPE = 'Query' |

Illustratively, the exemplary second query shown in Table V includes data selection criteria in line 001. The data selection criteria include a result field specification which specifies two result fields for which information is to be returned in the query result. Specifically, the result fields "ITEM" and "ITEM_TYPE" are specified. Again, it should be noted that other result fields can be specified dependent on system and user requirements. The exemplary second query further includes in line 002 a specification of the database table which contains the specified result fields, i.e., the DOD table of Table III above. Moreover, the exemplary second query includes data selection criteria in line 003. The data selection criteria indicate that all data records in the DOD table of Table III which are related to the query "Payroll" (OBJECT='Payroll' AND OBJECT_TYPE='Query') should be retrieved.

In the given example, the exemplary second query of Table V leads to a second query result. According to line 011 of Table III, the second query result includes the result set "PayrollDec02" which requires the query "Payroll" to be created. The ECM returns the second query result to the DAM modification tool which generates and displays the user interface screen 730. The user interface screen 730 displays a summarizing display section 732 which summarizes the second query result. Accordingly, the summarizing display section 732 indicates that the result set "PayrollDec02" is dependent of the query "Payroll".

In one embodiment, the user interface screen 730 allows the user to specify a predefined action to be taken on the result set "PayrollDec02". To this end, the user may click on a checkbox 734 to select the result set "PayrollDec02". Furthermore, the user may select a user-selectable element associated with the requested predefined action. By way of example, the user may click on a pushbutton 736 "DELETE" to request for deletion of the "PayrollDec02" result set. Again, it should be noted that deletion of the "PayrollDec02" result set is merely described by way of example and not intended to limit the invention thereto.

After pushing the pushbutton 736, the DAM modification tool creates a request for deletion of the result set "PayrollDec02" and transmits the request to the OMMC, i.e., the ECM. The ECM determines interdependencies between the result set "PayrollDec02" and corresponding dependent data objects. To this end, the ECM generates and executes a third query against the DOD. An exemplary third query is shown in Table VI below. By way of example, the exemplary third query of Table VI is described in SQL. However, specifying the exemplary third query of Table VI below in SQL is not intended to limit the invention accordingly. Instead, it is understood that any suitable query language, known or unknown, can be used to create the query of Table VI.

TABLE VI

THIRD QUERY EXAMPLE

| | |
|---|---|
| 001 | SELECT ITEM, ITEM_TYPE |
| 002 | FROM DOD |
| 003 | WHERE OBJECT = 'PayrollDec02' AND OBJECT_TYPE = 'Results' |

Illustratively, the exemplary third query shown in Table VI includes data selection criteria in line 001. The data selection criteria include a result field specification which specifies two result fields for which information is to be returned in the query result. Specifically, the result fields "ITEM" and "ITEM_TYPE" are specified. The exemplary third query further includes a specification of the database table which contains the specified result fields (line 002), i.e., the DOD table of Table III above. Moreover, the exemplary third query includes data selection criteria in line 003. The data selection criteria indicate that all data records in the DOD table of Table III which are related to the result set "PayrollDec02" (OBJECT='PayrollDec02' AND OBJECT_TYPE='Results') should be retrieved.

In the given example, the exemplary third query of Table VI leads to an empty query result. The ECM returns the empty query result to the DAM modification tool which generates and displays the user interface screen 740. As the received query result is empty, the DAM modification tool assumes that the retrieval of dependent data objects is completed. In other words, it is assumed that the first and second query results identify all dependent data objects which can be affected by the requested modification of the logical field "Age" and, consequently, by the requested deletion of the "Payroll" query and the result set "PayrollDec02".

The user interface screen 740 displays a summarizing display section 742 which summarizes the identified interdependent data objects, i.e., the logical field "Age", the query "Payroll" and the result set "PayrollDec02". Furthermore, a display section 744 is displayed which summarizes the requested predefined actions, i.e., the requested modification (i.e., deletion) of the logical field "Age" and the requested deletions of the query "Payroll" and the result set "PayrollDec02". In one embodiment, the identified interdependent data objects and the requested predefined actions are retrieved from a suitable change list (e.g., change list 634 of FIG. 6). In other words, in the given example the requested modification to the logical field "Age" as well as the requested deletions of the query "Payroll" and the result set "PayrollDec02" are stored in the change list. By way of example, for the "Age" field the change list may have an action entry "DELETE Age FROM DAM Demographic" and for the "Payroll" query the change list may have an action entry "DELETE Payroll FROM Saved Queries".

In one embodiment, the user interface screen 740 allows the user to confirm or cancel one or more of the requested predefined actions. To this end, the user may click on corresponding checkboxes 746 to select associated interdependent data objects for which the requested predefined actions should be confirmed. Accordingly, the user may click on a pushbutton 747 "CONFIRM" to confirm the requested predefined actions for the selected interdependent data objects, or on a pushbutton 748 "CANCEL" to cancel all requested predefined actions. Illustratively, the user clicks on all checkboxes 746 and, thus, selects all associated interdependent data objects. Assume now that the user clicks on the pushbutton 747 to confirm the requested predefined actions.

After pushing the pushbutton 747, the DAM modification tool instructs the ECM to perform the selected predefined actions (e.g., predefined action 650 of FIG. 6) on the selected interdependent data objects. In the given example, the DAM modification tool instructs the ECM to delete the logical field "Age", the query "Payroll" and the result set "PayrollDec02". Accordingly, the ECM performs the predefined actions and notifies a suitable DOD/DOAD manager (e.g., DOD/DOAD manager 646) of the performed predefined actions. Thus, the DOD/DOAD manager can update the DOD table of Table III. In the given example, the DOD manager deletes in Table III lines 002-003 related to the "Payroll" query and lines 009-011 related to the "PayrollDec02" result set.

It should be noted that the requested modification to the logical field "Age" in the given example is a deletion of this logical field. However, in one embodiment the requested modification can be a change of a field definition and/or a modification of a field attribute of the "Age" field. For simplicity, only a modification of a field attribute is described in more detail below.

Assume, for example, that the logical field "Age" has an attribute named "Displayable" (e.g., the "Displayable" attribute in line 004 of Table II) which is modified from "displayable=Yes" to "displayable=No". In other words, the "Age" field still exists after the modification, but information with respect to the logical field "Age" is no longer displayed and is, accordingly, hidden to users. In this case, if the "Age" field is only used as a condition field in corresponding data selection criteria of the abstract query "Payroll", the abstract query is still valid as data with respect to condition fields is generally not displayed. Accordingly, the ECM needs to identify the use of the "Age" field in the "Payroll" query in order to determine whether the "Payroll" query is still valid after modification of the "Age" field. To this end, the ECM generates and executes the exemplary query of Table VII below against the DOD table of Table III above. For purposes of illustration, the exemplary query is similar to the exemplary first query of Table IV above, but additionally requests information with respect to the use of the "Age" field in the identified dependent abstract queries.

TABLE VII

QUERY EXAMPLE

| | |
|---|---|
| 001 | SELECT ITEM, ITEM_TYPE, USE |
| 002 | FROM DOD |
| 003 | WHERE OBJECT = 'Age' AND OBJECT_TYPE = "Field' |

It should be noted that the exemplary query shown in Table VII specifies three result fields for which information is to be returned in the query result, i.e., the result fields "ITEM", "ITEM_TYPE" and "USE".

In the given example, the exemplary query of Table VII leads to a query result which includes the query "Payroll" (as described above with reference to the exemplary first query of Table IV) according to line 002 of Table III. The query result further indicates that the "Age" field is only used as a condition field in the "Payroll" query ("Condition" in line 002 of Table III). Accordingly, the "Payroll" query is still valid if the "Displayable" attribute of the "Age" query is modified from "displayable=Yes" to "displayable=No". In this case, the ECM can be configured to take no action against the query "Payroll".

However, it should be noted that various implementations of the exemplary query of Table VII are broadly contemplated. For instance, in the given example instead of including the "USE" field with the result fields (line 001 of Table VII), the "USE" field can be used as a condition field in the query condition in line 003 of Table VII. More specifically, the query condition in line 003 can be modified to include the statement "AND USE='Condition' ". Accordingly, on the basis of the modified query condition "OBJECT='Age' AND OBJECT_TYPE='Field' AND USE='Condition' ", the query result indicates whether the "Age" field is used only as a condition field in the "Payroll" query ("Condition" in line 002 of Table III).

It should further be noted that the predefined action(s) is performed in the given example in response to user input. However, in one embodiment the ECM is configured to determine and perform the predefined action(s) programmatically upon identification of the dependent objects of the logical field "Age", i.e., the "Payroll" query and the "PayrollDec02" result set. More specifically, the ECM may delete the "Age" field as requested and also delete the "Payroll" query and the "PayrollDec02" result set programmatically. In this case, user interaction can be limited to the selection of the logical field "Age" and, thus, the modification process can be accelerated as display of the user interface screens 720-740 can be omitted.

It should further be noted that the requested modification to the logical field "Age" in the given example is a deletion of this logical field from the data abstraction model. However, in one embodiment the logical field "Age" can also be removed from a corresponding view of the data abstraction model (e.g., DAM instance 372 of FIG. 3B). More specifically, assume that a given user specifies (using the user interface screen 710) the deletion of the logical field "Age" from a given view of the data abstraction model. In other words, the request for deletion is not configured for a physical deletion of the "Age" field from the data abstraction model as described above, but rather a change in the definition of a given view (filter) imposed over the data abstraction model. After removal of the "Age" field from the view, the field is still contained in the underlying data abstraction model but is no longer displayed to the given user (and other users) using the given view. In this case, if the ECM is configured to perform the predefined action(s) programmatically, the ECM may delete the "Age" field as requested and hide the "Payroll" query and the "PayrollDec02" result set automatically. Accordingly, the "Payroll" query and the "PayrollDec02" result set are no longer displayed to users having a role that is associated with the given view. However, the logical field "Age", the "Payroll" query and the "PayrollDec02" result set still exist and can be available to users having roles that are associated with other views of the data abstraction model.

Moreover, in one embodiment the request for removal of the "Age" field from the given view may occur in response to a change from a first view to a second view. For instance, assume that the given user is logged on in a first role (e.g., as an administrator with full access privileges) that is associated with the first view. Assume further that the given user changes his role to a second role (e.g., a researcher having limited access privileges) that is associated with the second view (e.g., DAM instance 374 of FIG. 3B). Assume now that both views are similar, but that the "Age" field is included only with the first view and not with the second view. In this case, the first view can be compared with the second view in order to determine whether an implicit request for modification occurred, whereby a logical deletion of the "Age" field is identified. Accordingly, a modification process as described above can be performed with respect to the implicit request for deletion of the logical field "Age".

Assume now that the given user who is logged on in the first role logs out and then logs back on in the second role. In this case a particular change in the context of the user can not be ascertained since the act of logging on is not a change from one view to another. Accordingly, the OMMC 150 would not be invoked for verification. However, in one embodiment such a situation is detected by performing a hash code verification for each record in the DOD and/or DOAD. In this embodiment, a hash code is associated with each record in the DOD and/or DOAD. An exemplary DOD table including hash codes is shown in Table IX below.

TABLE IX

EXEMPLARY DOD TABLE INCLUDING HASH CODES

| 001 | ITEM | ITEM_ TYPE | OBJECT | OBJECT_ TYPE | USE | HASH CODE |
|---|---|---|---|---|---|---|
| 002 | Payroll | Query | Age | Field | Condition | 0173756 |
| 003 | Payroll | Query | Name | Field | Output | 1752562 |

Illustratively, lines 001-003 of Table IX correspond to lines 001-003 of Table III, to which a sixth column has been added. More specifically, the exemplary DOD table shown in Table IX includes six columns, "ITEM", "ITEM_TYPE", "OBJECT", "OBJECT_TYPE", "USE" and "HASH CODE". The first five columns correspond to the columns of the DOD table of Table III above. The sixth column "HASH CODES" contains hash codes which are suitable to a state of a given data object identified in the "OBJECT" column at creation time of a corresponding dependent data object defined in the "ITEM" column. By way of example, according to line 002, hash code "0173756" represents a state for the logical field "Age" at creation time of the abstract query "Payroll". For creation of the hash code "0173756", all attributes of the "Age" field and corresponding values, such as the "Displayable" attribute and a corresponding "Yes" value, are used as input to a suitable hash code generator. Accordingly, all attributes effect the generation of the hash code and, consequently, a change in any of the attributes results in a different hash code. For example, if the value of the "Displayable" attribute is changed from "Yes" to "No", a subsequently generated hash code of the "Age" field also changes from its previous value (i.e., "0173756" in this example). All other attributes of the "Age" field equally affect the hash code of the "Age" field. However, it should be noted that generation of hash codes is well-known in the art and is, therefore, not described in detail herein.

Accordingly, in one embodiment hash codes are determined from the underlying data abstraction model for all data objects which are identified in the "OBJECT" column of Table IX when the given user logs on. The determined hash codes are compared with the corresponding hash codes included with the column "HASH CODES" of Table IX. According to one aspect, identical hash codes identify identical data objects, while differing objects for a given data object indicate that the given data object has been changed since creation of a corresponding dependent data object. For instance, assume that for the logical field "Age" (identified in the "OBJECT" column in line 002 of Table IX) a hash code "1173752" is determined. Assume further that for the logical field "Name" (identified in the "OBJECT" column in line 003 of Table IX) a hash code "1752562" is determined. Accordingly, as the determined hash code for the "Name" field corresponds to the respective hash code in the DOD table of Table IX, the "Name" field has not been modified. However, as the hash codes for the "Age" field do not match, the "Age" field has been modified. In this case, a modification process as described above can be initiated with respect to the modified "Age" field.

In one embodiment, the described hash code verification is performed only once. More specifically, when the user logs back on, the hash code verification is performed and for all validated data objects, the validation can be indicated in the DOD table. More specifically, once a hash code of a given data object has been verified, the hash code is removed from the DOD table in one embodiment. Accordingly, if a data object in the DOD table is not having an associated hash code, this indicates that the data object has already been verified. Thus, when the user logs out again and, subsequently, back on again, a new verification can be avoided. However, alternative embodiments are also contemplated. For instance, all persistently stored abstract queries can be retrieved when the given user logs on. Thus, a background process can be started which runs all retrieved abstract queries in order to determine which queries are valid. From determined invalid queries, the employed logical fields can be identified. The identified logical fields can be checked for validity and for invalid logical fields modification processes can be performed as described above.

An Exemplary Method for Managing Interdependent Data Objects

Figure 8:
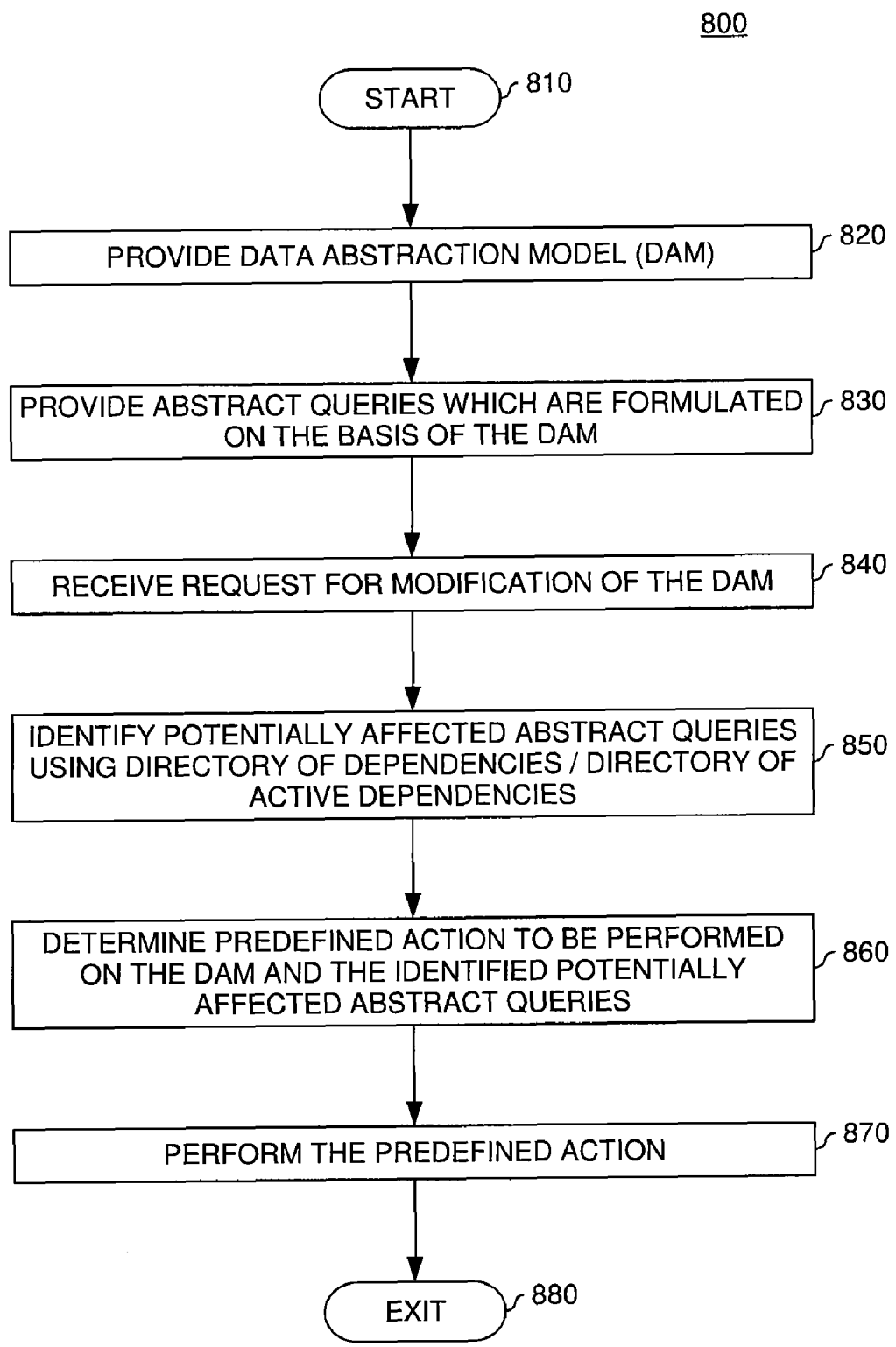
FIG. 8 is a flow chart illustrating a method of managing modifications to a data abstraction model in one embodiment.

Referring now to FIG. 8, an exemplary method 800 for managing modifications to interdependent data objects (e.g., data abstraction model 132, saved queries 136 and unsaved queries 614 of FIG. 6) is illustrated. In one embodiment, at least a portion of the steps of method 800 is performed using a user interface (e.g., user interface 610 of FIG. 6), and an OMMC (e.g., OMMC 150 of FIG. 6). Method 800 starts at step 810.

At step 820, a data abstraction model (e.g., data abstraction model 132 of FIG. 6) is provided. Providing the data abstraction model includes creating the data abstraction model, retrieving it from memory (e.g., memory 116 of FIG. 1) or loading it to a suitable computer system (e.g., computer system 110 of FIG. 1). At step 830, abstract queries (e.g., saved queries 136 of FIG. 6) are provided. The abstract queries are formulated on the basis of the data abstraction model and can be stored persistently in a suitable data storage (e.g., database 139 of FIG. 1). Providing the abstract queries further includes creating the abstract queries (e.g., unsaved queries 614 of FIG. 6).

At step 840, a request for modification of the data abstraction model is received. In one embodiment, the request for modification includes a request to (i) delete a given logical field of the data abstraction model, (ii) rename the given logical field, and (iii) change one or more attributes of the given logical field.

At step 850, potentially affected dependent data objects, such as abstract queries and query results, are identified using a suitable DOD and/or DOAD table (e.g., DOD 642 and DOAD 644 of FIG. 6). Determining potentially affected dependent data objects can be performed as described above with reference to FIG. 7.

At step 860, one or more predefined actions (e.g., predefined action 650 of FIG. 6) to be performed on the data abstraction model and the identified potentially affected dependent data objects are determined. The determined predefined action(s) is performed at step 870. As noted above, any predefined actions performed with respect to the data abstraction model and the identified potentially affected dependent data objects are not performed without first notifying a user of the actions, and their possible consequences, and receiving a responsive user instruction permitting the predefined actions against the data abstraction model and the identified potentially affected dependent data objects. In this regard, the user notification can itself be considered a predefined action. Method 800 then exits at step 880.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer-readable storage medium containing a program which, when executed by a processor, performs operations for managing modifications to at least one of a plurality of interdependent data objects, the operations comprising:
receiving a request for modification of a given data object having at least one dependent data object, wherein the given data object and the at least one dependent data object comprise logical fields defined according to a data abstraction model;
accessing a directory of dependencies containing at least one record for each of the plurality of interdependent data objects including the at least one dependent data object, wherein each record describes an interdependency between at least two of the interdependent data objects and wherein a record for the at least one dependent data object describes an interdependency between the given data object and the at least one dependent data object;
identifying the interdependency between the given data object and the at least one dependent data object using the accessed directory of dependencies, wherein the identified interdependency presents an indication that the at least one dependent data object will become invalid as a result of performing the modification;
as a result of having identified the interdependency, performing the requested modification resulting in the data abstraction model being modified; and
performing a predefined action on at least one of the modified data abstraction model and the at least one dependent data object by executing one or more instructions on a computer processor, wherein the predefined action is formulated to avoid the at least one dependent data object becoming invalid as a result of performing the requested modification.

2. The computer-readable storage medium of claim 1, wherein accessing the directory of dependencies comprises issuing a query against the directory of dependencies in response to the request for modification; and wherein identifying the interdependency comprises receiving a result set containing those interdependent data objects affected by the request for modification.

3. The computer-readable storage medium of claim 1, wherein the request for modification of the given data object comprises a request for at least one of:
(i) deleting the given data object;
(ii) renaming the given data object; and
(iii) changing one or more attributes of the given data object.

4. The computer-readable storage medium of claim 1, wherein the predefined action comprises, for the given data object, at least one of:
(i) deleting the given data object;
(ii) renaming the given data object; and
(iii) changing one or more attributes of the given data object; and for the at least one dependent data object at least one of:
(i) disabling access to at least one portion of the at least one dependent data object; and
(ii) deleting at least one portion of the at least one dependent data object.

5. The computer-readable storage medium of claim 1, wherein performing the predefined action comprises:
modifying the given data object according to the requested modification; and
performing an action for the at least one dependent data object, wherein the action includes at least one of:
disabling access to the at least one dependent data object, and
deleting the at least one dependent data object.

6. The computer-readable storage medium of claim 1, wherein performing the predefined action comprises:
denying the requested modification of the given data object.

7. The computer-readable storage medium of claim 1, wherein the request for modification of the given data object is based on user input; the operations further comprising:
displaying a dependency list comprising the at least one dependent data object to the user; and
receiving user input specifying the predefined action on the basis of the dependency list.

8. The computer-readable storage medium of claim 1, wherein the request for modification of the given data object comprises a request for a temporary modification of the given data object; and wherein performing the predefined action comprises:
temporarily modifying the given data object according to the requested modification; and
temporarily invalidating at least a portion of the at least one dependent data object.

9. A computer-readable storage medium containing a program which, when executed by a processor, performs operations for managing modifications to a data abstraction model abstractly describing data in a database and defining a plurality of logical fields, the operations comprising:
receiving a request for modification of a given logical field from the data abstraction model, the given logical field defining an abstract representation of a specific set of physical data in the database and having at least one dependent data object, wherein the at least one dependent data object comprises said logical fields defined according to the data abstraction model;
accessing a directory of dependencies containing at least one record for each of the plurality of logical fields and a plurality of interdependent objects including the at least one dependent data object, wherein each record describes an interdependency between at least two of the interdependent data objects and wherein a record for the at least one dependent data object describes an interdependency between the given logical field and the at least one dependent data object;
identifying the interdependency between the given data object and the at least one dependent data object using the accesses directory of dependencies, wherein the identified interdependency presents an indication that the at least one dependent data object will become invalid as a result of performing the modification;
as a result of having identified the interdependency, performing the requested modification resulting in the data abstraction model being modified; and
performing a predefined action on the at least one of the modified data abstraction model and the at least one dependent data object by executing one or more instructions on a computer processor, wherein the predefined action is formulated to avoid the at least one dependent data object becoming invalid as a result of performing the requested modification.

10. The computer-readable storage medium of claim 9, wherein accessing the directory of dependencies comprises issuing a query against the directory of dependencies in response to the request for modification and wherein identifying the interdependency comprises receiving a result set containing those interdependent data objects affected by the request for modification.

11. The computer-readable storage medium of claim 9, wherein the at least one dependent data object is an abstract query having one or more logical fields including the given logical field; and wherein the data abstraction model is adapted for transforming the one or more logical fields of the abstract query into a form consistent with a physical representation of the data in the database.

12. The computer-readable storage medium of claim 9, wherein the request for modification of the given logical field comprises a request for at least one of:
(i) deleting the given logical field in the data abstraction model;
(ii) renaming the given logical field; and
(iii) changing one or more attributes of the given logical field.

13. The computer-readable storage medium of claim 9, wherein the predefined action comprises, for the given logical field, at least one of:
(i) deleting the given logical field in the data abstraction model;
(ii) renaming the given logical field; and
(iii) changing one or more attributes of the given logical field; and for the at least one dependent data object at least one of:
(i) disabling access to at least one portion of the at least one dependent data object; and
(ii) deleting at least one portion of the at least one dependent data object.

14. The computer-readable storage medium of claim 9, wherein performing the predefined action comprises:
modifying the given logical field according to the requested modification; and
performing an action for the at least one dependent data object, wherein the action includes at least one of:
disabling access to the at least one dependent data object, and
deleting the at least one dependent data object.

15. The computer-readable storage medium of claim 9, wherein performing the predefined action comprises:
denying the requested modification of the given logical field.

16. The computer-readable storage medium of claim 9, wherein the request for modification of the given logical field is based on user input; the operations further comprising:
displaying a dependency list comprising the at least one dependent data object to the user; and
receiving user input specifying the predefined action on the basis of the dependency list.

17. The computer-readable storage medium of claim 9, wherein the request for modification of the given logical field comprises a request for a temporary modification of the given logical field; and wherein performing the predefined action comprises:

temporarily modifying the given logical field according to the requested modification; and temporarily invalidating at least a portion of the at least one dependent data object.

18. The computer-readable storage medium of claim 9, wherein the predefined action is only performed on the at least one dependent data object if it is determined that the at least one dependent data object is affected by the modification of the given logical field.

19. The computer-readable storage medium of claim 9, wherein performing the predefined action comprises:

modifying the given logical field according to the requested modification; and validating the at least one dependent data object on the basis of the modified logical field.

20. The computer-readable storage medium of claim 19, wherein the at least one dependent data object is an abstract query having one or more logical fields including the given logical field; and wherein the data abstraction model is adapted for transforming the one or more logical fields of the abstract query into a form consistent with a physical representation of the data in the database; and wherein validating the abstract query on the basis of the modified logical field comprises:

executing the abstract query against the database; and determining, whether a valid query result is obtained.

21. A system, comprising:

a processor;

a plurality of interdependent data objects including a given data object having at least one dependent data object, wherein the given data object and the at least one dependent data object comprise logical fields defined according to a data abstraction model;

a directory of dependencies containing at least one record for each of the plurality of interdependent data objects including the at least one dependent data object, wherein each record describes an interdependency between at least two of the interdependent data objects and wherein a record for the at least one dependent data object describes an interdependency between the given data object and the at least one dependent data object; and an object modifications management component which, when executed by the processor, is configured to:

receive a request for modification of the given data object;

identify the interdependency between the given data object and the at least one dependent data object using the accessed directory of dependencies, wherein the identified interdependency presents an indication that the at least one dependent data object will become invalid as a result of performing the modification;

as a result of having identified the interdependency, perform the requested modification resulting in the data abstraction model being modified; and perform a predefined action on at least one of the modified data abstraction model and the at least one dependent data object by executing one or more instructions on a computer processor, wherein the predefined action is formulated to avoid the at least one dependent data object becoming invalid as a result of performing the requested modification.

* * * * *